United States Patent
Hou

(10) Patent No.: US 7,234,366 B2
(45) Date of Patent: Jun. 26, 2007

(54) POWER TAKE-OFF CONTROL SYSTEM

(75) Inventor: Yanming Hou, Pleasant Prairie, WI (US)

(73) Assignee: CNH America LLC, New Holland, PA (US)

( * ) Notice: Subject to any disclaimer, the term of this patent is extended or adjusted under 35 U.S.C. 154(b) by 686 days.

(21) Appl. No.: 10/810,878

(22) Filed: Mar. 26, 2004

(65) Prior Publication Data

US 2005/0217397 A1 Oct. 6, 2005

(51) Int. Cl.
*F16H 37/00* (2006.01)

(52) U.S. Cl. ........................ 74/11; 192/103 F; 701/68

(58) Field of Classification Search ................ 74/11, 74/15.82; 192/103 F, 103 R, 109 F; 701/67, 701/68; 477/175, 176, 180; 180/53.1, 53.8

See application file for complete search history.

(56) References Cited

U.S. PATENT DOCUMENTS

| | | | |
|---|---|---|---|
| 4,458,471 A | 7/1984 | Herwig | 56/10.2 |
| 4,760,902 A | 8/1988 | Bellanger | 192/0.033 |
| 5,251,132 A | 10/1993 | Bulgrien | 364/424.1 |
| 5,310,974 A | 5/1994 | Churchill et al. | 200/566 |
| 5,454,767 A | 10/1995 | Clausen et al. | 477/32 |
| 5,494,142 A | 2/1996 | Kale | 192/12 C |
| 5,513,734 A | 5/1996 | Scotti | 192/70.27 |
| 5,549,185 A | 8/1996 | Kale | 192/12 C |
| 5,562,173 A | 10/1996 | Olson | 180/53.4 |
| 5,601,172 A | 2/1997 | Kale et al. | 192/85 R |
| 5,778,329 A | 7/1998 | Officer et al. | 701/55 |
| 5,806,640 A | 9/1998 | Kale | 192/12 C |
| 5,971,888 A * | 10/1999 | Goode | 477/107 |
| 6,080,081 A | 6/2000 | Sauermann et al. | 477/79 |
| 6,205,385 B1 | 3/2001 | Stelzle et al. | 701/50 |
| 6,267,189 B1 | 7/2001 | Nielsen et al. | 180/53.1 |
| 6,517,465 B2 | 2/2003 | Hrazdera | 477/174 |
| 6,554,742 B2 | 4/2003 | Milender et al. | 477/155 |
| 6,729,459 B2 * | 5/2004 | Reinards et al. | 192/103 F |
| 7,048,106 B2 * | 5/2006 | Hou | 192/103 F |

* cited by examiner

*Primary Examiner*—David M. Fenstermacher
(74) *Attorney, Agent, or Firm*—Stephen A. Bucchianeri; John William Stader; Michael G. Harms

(57) ABSTRACT

A control system and method for detecting variable load types and controlling the operation of a PTO clutch to effect engagement of the clutch with variable loads, and especially to more optimally effect the engagement of a clutch with a very light load or an associated over-running clutch is disclosed. The control system includes a controller that receives input and output clutch shaft speed signals and generates control signals to control the pressure applied by the clutch. If no appreciable engine droop is detected at the time of initial movement of the output clutch shaft, the load is considered to be of a very light load type, and a set of control signals based upon such load type designation, which control signals define a control curve that is flatter and more gentle than would otherwise be considered desirable, is thereafter applied to the clutch to effect engagement of the load.

24 Claims, 11 Drawing Sheets

POWER TAKE-OFF CONTROL SYSTEM

TECHNICAL FIELD

The present invention relates to a power take-off (PTO) control system and method for more optimally engaging and operating loads which are applied to the PTO shaft and which are either very light or which are applied to an over-running clutch associated with the PTO output shaft, especially for an agricultural vehicle such as a tractor. In particular, the present invention relates to a control system and method for detecting variable load types and controlling the operation of a PTO clutch to effect engagement of the clutch with variable loads, and especially to more optimally effect the engagement of a clutch under extreme conditions, such as a very light load and/or over-running clutch.

BACKGROUND ART

PTOs are used on many types of vehicles, including on agricultural vehicles such as tractors, to provide power for equipment or implements, such as, for agricultural purposes, combines, mowers, balers, forage harvesters and spreaders.

Modern tractors commonly have horsepower ratings in excess of 100 horsepower. However, the shaft sizes for PTOs have not changed due to the need to maintain compatibility with older equipment and maintain the standardization for PTOs. Thus, the torque output of PTOs for many modern tractors is no longer limited by the tractor horsepower. Rather, the torque output is limited by the strength of the PTO shaft and the failure thereof. In addition to causing PTO shaft failures, the torque produced by the high horsepower tractors can accelerate equipment attached to the respective PTO at a rate which can damage the equipment.

In view of the problems associated with the control of PTO shafts in high horsepower tractors, it was found desirable to provide a PTO clutch control system for protecting PTO shafts from catastrophic failure and for providing PTO shaft accelerations at rates which protect the shafts and attached equipment during clutch engagement.

Typical of such a system is the system of U.S. Pat. No. 5,494,142, which discloses a PTO control system for vehicles, such as farm tractors including a power take-off (PTO) shaft, for supplying rotational motion to an implement of the type which may be stationary or towed by the tractor. Power is transferred to the PTO shaft by a clutch including an input shaft coupled to a power source and an output shaft coupled to the PTO shaft. The clutch transmits a maximum torque between the input and output shafts in response to a maximum clutch pressure and transmits a variable torque between the input and output shafts in response to a given clutch engagement pressure that is less than the maximum clutch engagement pressure. Typically, a generally linear, gentle ramping up of current/pressure is employed to achieve smooth engagement.

The control system includes a first transducer disposed to generate an input signal representative of the rotational speed of the input shaft, a second transducer disposed to generate an output signal representative of the rotational speed of the output shaft, and a control circuit. The control circuit is coupled to the clutch control, the first transducer, and the second transducer.

While such a control system has been of great value and effectiveness, it and other control systems have continued to experience difficulties when attempts are made to drive PTOs under extreme conditions. With such systems, no differentiation was made with respect to the loads applied, be they very light or very heavy. With a light applied load, initial PTO shaft movement could occur at a relatively early time and the full shaft speed would be reached before a modulation is effectively executed. With a heavy load, however, initial PTO shaft movement would not occur until a later time, leaving very little time for modulation. Many systems sought a compromise under which load engagement worked reasonably well with intermediate loads, but less well with extreme situations, including situations where over-running clutches were associated with the PTO output shaft.

The strategy of employing a generally linear, ramping up of current/pressure to achieve smooth engagement, while generally relatively effective, nevertheless suffered from various shortcomings, especially under extreme load conditions, including use with associated over-running clutches.

The system of U.S. Pat. No. 6,267,189 addressed several of the remaining problems in greater detail, and explains in significant detail the problems encountered when over-running clutches are employed, including the possibility of placing undesirable stress on the PTO due to "locking delay" which occurs when the initially unengaged locking pins of an over-running clutch engage the locking notches thereof at a time subsequent to initial movement of the PTO output shaft. As was discussed therein, while the locking delay is of little concern at those times when PTO clutch is engaged, the locking delay may be problematic during engagement of PTO. In general, this is because a PTO clutch is modeled as ideally having two distinct operational states, (a) a first, disengaged state in which the plates of the clutch are not compressed and so the clutch does not transmit torque between the input shaft and the output shaft (and then to any connected load), and (b) a second, engaged state in which the plates of the clutch are compressed and the clutch transmits torque in an amount approximately directly related to the hydraulic fluid pressure applied to the clutch. However, in practice, a PTO clutch may still transmit a small but not negligible amount of torque from the input shaft to the output shaft even during the first, disengaged state, particularly if the hydraulic fluid pressure within the clutch is being increased to compress the plates and to cause the clutch to enter the engaged state. Even though this small amount of torque may be insufficient to rotate an PTO output shaft if equipment is directly loaded thereto, the torque may be sufficient to initially rotate an output shaft coupled as an input to an over-running clutch while locking pins 9 of the over-running clutch are disengaged from the locking notches thereof and until such time as the over-running clutch output locks to the over-running clutch input (i.e., while the transmitted torque may not be sufficient to rotate the a locked-up over-running clutch and its load, it may be sufficient to rotate the PTO output shaft during the locking delay). To summarize, the PTO clutch may transmit enough torque from the input shaft to the output shaft during the PTO engagement process, before the clutch is engaged, that the PTO will rotate from a position in which locking pins of the over-running clutch are disengaged from the locking notches to the position in which the locking pins are engaged with the locking notches.

Although U.S. Pat. No. 6,267,189 discussed in some considerable detail the problems posed by associated over-running clutches during PTO engagement operations, such patent's principal contribution to improved PTO clutch operation was directed less to the actual detection and controlled engagement of over-running clutches and more to an improved manner or strategy of overall PTO modulation.

The system of such patent made use of a manner of adjusting the current increases to be applied to the clutch based upon comparisons made during the course of modulation of the actual acceleration and the desired acceleration, and basically presumed, based upon the fact that the mechanical parts between the PTO output shaft and the over-running clutch (i.e., the input shaft portion of the over-running clutch) could effectively be dragged to turn when the PTO clutch was only partially pressurized, that the actual acceleration would be very low when an over-running clutch was associated with the PTO output shaft. The system of such patent operated during modulation mode to increase the current at a slower rate when the acceleration was higher and at a faster rate when the acceleration was lower, except when the acceleration was found to be lower than some threshold, such as ⅙ of the desired acceleration, in which condition (presumptive indication of an over-running clutch) the increase in current was set to the lowest rate.

While such a strategy worked reasonably well in many cases, it had two significant drawbacks.

First, over-running clutches were quite commonly used with PTO driven implements, with different clutches exhibiting different kinds or degrees of "lock delay". The strategy of U.S. Pat. No. 6,267,189 was generally more effective for over-running clutches that exhibited relatively small "lock delay", but less so for over-running clutches that exhibited more pronounced "lock delays" and/or when the mechanical parts between the PTO output shaft and over-running clutch were light. In such cases, the detected acceleration would generally not only be higher than the threshold value, but higher than the normal acceleration encountered with non-over-running clutches and implements. Because the detected acceleration values did not fall within the "presumptive" category of over-running clutches, current increases would typically thus be applied at a higher rate than would be desirable for an over-running clutch, often resulting in abrupt engagements.

Second, when heavy loads and non-over-running clutches and implements were applied to the PTO output shaft, especially when operated at a low engine RPM, the actual PTO shaft acceleration could be so low as to be lower than the threshold, and such loading situations could then result in such loads being treated as "presumptive" over-running clutches when they were not. Under such condition, use of the strategy of U.S. Pat. No. 6,267,189 resulted in a very slow increase in current when, in actuality, it was preferred that current be more aggressively increased. Use of the strategy under such conditions thus often resulted in delayed and sluggish engagement and, in severe cases, failures to effect clutch lock-up within a desired or required time limit.

Thus, although the system of U.S. Pat. No. 6,267,189 significantly improved the overall manner in which PTO engagement is effected during the modulation period between initial movement of the output shaft and clutch lock-up and decreased the likelihood of encountering severe problems with extreme loads, and despite the advances realized through or as a result of the uses of such strategies, which have proven effective and beneficial in many instances, dealing with extreme load situations has remained troubling. In certain instances, the difficulties in effecting engagement could still result in either the application of very abrupt torque to a very light load, and the risk of possible damage thereto, or by a sudden and abrupt change in the load response due to locking delay when an over-running clutch is in use, which, in severe cases, could include risks associated with breakage of the shaft, unsafe operation, or engine stall.

SUMMARY OF THE INVENTION

The present invention is intended to address such difficulties as might arise when the PTO shaft can be loaded with variable loads, and especially when either a very light load or an associated over-running clutch is applied to the PTO output shaft. The invention is thus directed to a control system and method for more optimally effecting engagement and operation of variable implement loads that may be applied to a PTO shaft.

By detecting the existence of either a very light load or an associated over-running clutch at the point of initial movement of the output shaft, it is possible to establish an appropriate engagement control curve to effect a safe and smooth engagement of the load and to avoid problems such as might otherwise be encountered when an associated over-running clutch is operated to engage its load.

When a light load is present, a flatter linear control curve can be utilized without deleteriously affecting the length of time required to effect lockup of the PTO output shaft. However, general use of such a flatter linear control curve for all loads has not been advantageous because, with heavier loads, the time to effect lockup is significantly lengthened. Many systems thus sought to achieve a compromise that would effect engagement of a load in a manner that, depending upon the load applied, would provide relatively smooth engagement within relatively short times for intermediate loads, but which suffered when extreme loads, such as heavy or light loads or associated over-running clutches were applied to the PTO output shafts. The ability of the present control system to recognize a light load and/or the association therewith of an over-running clutch allows the present control system to adjust control curves to the loading, especially in the cases of very light loads and over-running clutches. The resultant combination of flatter linear control with accompanying modulation of acceleration upon the detection of light load conditions, including conditions of over-running clutches, is beneficial in achieving smoother and safer PTO engagement for such load conditions.

The invention can also be employed in conjunction with other techniques and methods for controlling engagement of a loaded PTO shaft, including techniques and methods such as are disclosed, for example, in U.S. Pat. Nos. 5,494,142 and 6,267,189 and in other pending or contemplated applications of the assignee of the present application or related companies, which techniques and methods, among other things, may permit or allow automatic calibration of the starting point based upon both PTO and engine shaft speed, wherein the commencement of either PTO shaft movement or engine droop, whichever is detected first, will result in determination of the current being applied at such time, which current value can be averaged with the current values for a plurality of previous engagements to determine a reference current value to be used as a standing point for the next engagement operation. The use of such other techniques and methods are not necessary for the use and enjoyment of the present invention, but systems that employ combinations of these techniques and methods are generally more preferable than more basic systems since additional advantages and improved performance can be realized than with the more basic systems.

DETAILED DESCRIPTION OF THE INVENTION

Figure 1:
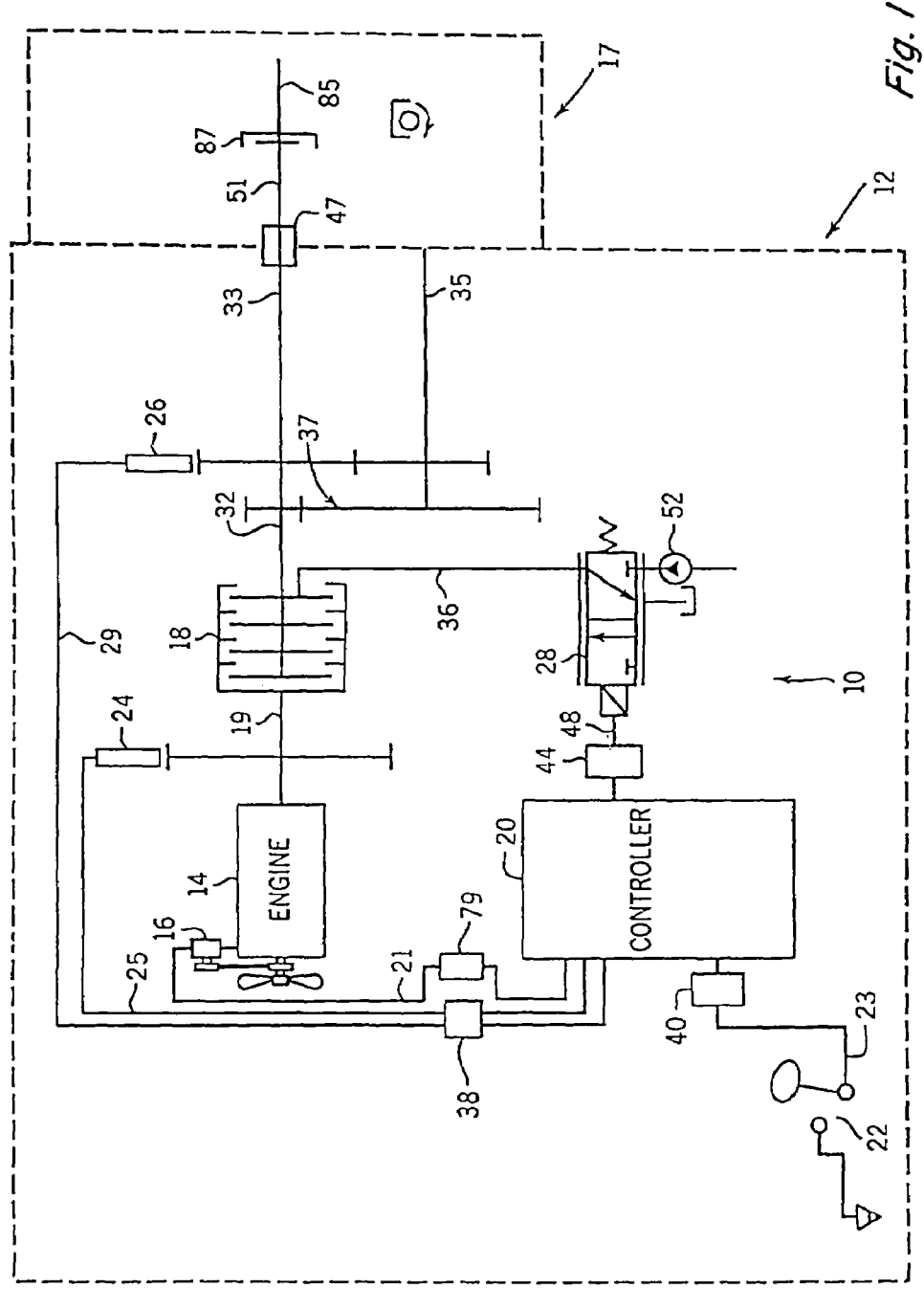
FIG. 1 is a schematic block diagram of a PTO drive and control system.

FIG. 1 depicts an embodiment of a power take-off (PTO) clutch and brake control system 10 for an agricultural vehicle (such as a tractor schematically represented by the dashed line labeled 12) that includes the present invention. With the exception of the PTO clutch control system 10, tractor 12 may be a conventional agricultural tractor of the type including an engine 14 having conventional accessories such as an alternator 16. Engine 14 is the power source for tractor and, in addition to providing power to the drive wheels (not shown) of tractor 12, provides the power to apply rotational motion to a multi-plate hydraulically actuated PTO clutch 18. Depending upon whether PTO clutch 18 is engaged, power from engine 14 may in turn be transmitted to an output shaft 32. Output shaft 32 is shown directly coupled to a 1000 RPM PTO (high speed PTO) shaft 33 and also is shown coupled to a 540 RPM PTO (low speed PTO) shaft 35 by a reduction gear 37. In alternative embodiments, high speed PTO shaft 33 may be of another speed rating such as 750 RPM. While, in alternate embodiments, high and low speed PTO shafts 33 and 35 may be provided at separate output terminals on tractor 12, preferably each PTO will be employed at a single output terminal (one PTO may be substituted for the other).

Control system 10 includes a controller 20 (including, e.g., a digital microprocessor such as the Intel TN83C51FA), a PTO on/off switch 22, an output clutch speed transducer 26, and a normally closed, solenoid operated, hydraulic, proportional clutch control valve 28. Control system 10 also is coupled to alternator 16 and receives a signal therefrom representing the speed of engine 14.

The engine speed is equal to or, depending upon gear reduction, a multiple or proportion of the speed of an input shaft 19 to PTO clutch 18 that receives power from engine 14 and transmits power to the clutch. In alternate embodiments, a signal representative of the speed of input shaft 19 (that is directly representative of the speed of engine 14) may be obtained by way of an input shaft transducer 24 coupled to shaft 19 instead of alternator 16. Consequently, for purposes of this document, reference may interchangeably be made to the engine and/or its speed or to the input shaft and/or its speed, with like effect, and treating the speeds as being alike although they may differ proportionally.

Transducers 24 and 26 may, by way of example and not of limitation, be variable reluctance sensors.

Alternator 16 and transducer 26 are coupled to digital inputs of controller 20 by, respectively, electrical conductors 21 and 29 and conditioning circuits 79 and 38, which may be integral to controller 20. (In alternative embodiments in which signals regarding input shaft 19 are provided by transducer 24, an electrical conductor 25 along with conditioning circuit 38 may be employed.) Conditioning circuits 79 and 38 filter radio and other undesirable frequencies of interference from the signals produced by alternator 16 and transducer 26 (or, in alternate embodiments, transducer 24) and introduced in conductors 21 and 29 (or, in alternate embodiments, conductor 25). Additionally, conditioning circuits 79 and 38 typically place the signals produced by alternator 16 and transducer 26 (or transducer 24) within a 5 V range and typically provide these signals with a generally square wave configuration which can be appropriately sampled by controller 20. Accordingly, the signals applied to controller 20 by alternator 16 (or transducer 24) and transducer 26 typically have a generally square wave configuration with a frequency proportional to the rotational speed of input shaft 19 (or of engine 14) and output shaft 32, respectively.

Switch 22 has associated therewith a conditioning circuit 40, which may be integral to controller 20. Depending upon the application, circuit 40 may provide signal inversion and appropriate filtering to eliminate switch bounce. However, depending upon the type of controller 20 used, circuit 40 may be eliminated. The signal produced by switch 22 is applied to a digital input of controller 20 via electrical conductor.

Hydraulic valve 28 is coupled to a digital output of controller 20 by an appropriate amplification and signal conditioning circuit 44, which may be integral to controller 20, and electrical conductor 48. As will be discussed in greater detail below, controller 20 applies a signal, such as an analog or a pulse-width modulated (PWM) signal, to valve 28 via electrical conductor 48 and circuit 44. Due to the nature of the solenoid that operates valve 28, amplification and isolation circuit 44 is utilized to produce a control signal having sufficient voltage and current to operate valve 28. Additionally, due to inductive kickbacks which may potentially be produced by the solenoids of valve 28, isolation may be provided in circuit 44 to protect controller 20. While controller 20 is typically configured to apply an analog current signal to valve 28, in alternative embodiments an analog voltage signal, a pulse-width modulated (PWM) current signal, or a PWM voltage signal can be similarly employed and provided to valve 28. In each case, the magnitude of the signal provided (which, in the case of a PWM current or voltage signal, is the time-average magnitude of the signal and therefore depends upon the duty cycle or pulse width of the signal) is proportional to the desired pressure from valve 28.

Turning to the operation of valve 28, valve 28 is a proportional hydraulic valve which applies hydraulic fluid to PTO clutch 18 from the system hydraulic fluid source 52 at a pressure which is related to (e.g. proportional to) the time-averaged voltage applied to the solenoid associated with valve 28. Thus, the pressure of the fluid applied to PTO clutch 18 via hydraulic conduit 36 by valve 28 may be controlled by applying a variable current signal to valve 28.

In alternate embodiments, the pressure may be controlled by applying a variable voltage signal, a PWM current signal, or PWM voltage signal to valve 28. Where a PWM signal is applied to the solenoid of valve 28 to control the pressure of the hydraulic fluid applied to PTO clutch 18, the pressure of the fluid is proportional to the pulse width of the PWM signal produced by controller 20.

As discussed above, PTO clutch 18 is a multi-plate hydraulic clutch. This type of clutch is capable of transferring a torque from clutch input shaft 19 to output shaft 32, where the torque is generally proportional to the pressure of the hydraulic fluid applied to PTO clutch 18. Output shaft 32 is shown directly coupled to 1000 RPM PTO (high speed PTO) 33 and also is shown coupled to 540 RPM PTO (low speed PTO) 35 by reduction gear 37. In alternative embodiments, high speed PTO 33 may be of another speed rating, such as 750 RPM. Accordingly, the torque transferred between shafts 19 and 32 will be generally proportional to the magnitude of the analog current signal applied from controller 20 to the solenoid of valve 28. (In alternate embodiments where an analog voltage signal, a PWM current signal, or a PWM voltage signal is provided to valve 28, the torque transferred between shafts 19 and 32 also will be generally proportional to the magnitude of the applied signal, which in the case of a PWM signal is proportional to the duty cycle or pulse width of the signal.) While, in the ideal case, it may be convenient to have the torque transferred between shafts 19 and 32 exactly proportional to the magnitude of the current signal applied to valve 28, in mechanical systems such a relationship may be difficult to obtain. Accordingly, controller 20 is programmed to compensate for the inability to obtain such proportionality, and overall non-linearity in the electronics and mechanism of the control system 10.

Also shown in FIG. 1 is an implement 17 that may be attached to (typically, towed by) tractor 12. Implement 17 includes equipment (not shown) that is operated by way of power from tractor 12. The equipment may perform one or more actions upon a field, such as planting or tilling. Implement 17 is capable of receiving power from tractor 12 via an implement input shaft 51 coupled to high speed PTO 33 via a coupler 47. When PTO clutch 18 is engaged and is transmitting power from engine 14 to output shaft 32 and high speed PTO 33, power is also then transmitted to implement input shaft 51. In addition to implement input shaft 51, implement 17 also includes an implement output shaft 85 that couples, and transmits power from, the implement input shaft to the equipment. Implement input shaft 51 and implement output shaft 85 are coupled via an over-running clutch 87. Over-running clutch 87 allows implement output shaft 85 to continue to rotate freely even when implement input shaft 51 is not rotating, and allows the implement output shaft to rotate at a higher angular velocity than the implement input shaft. If locking pins and notches (not shown) of over-running clutch 87 are not engaged, implement input shaft 51 must rotate a portion of a rotation to engage the pins with the notches before the over-running clutch will transmit power from the input shaft to implement output shaft 85. Implement input shaft 51 is coupled to high speed PTO 33. In alternate embodiments, a similar implement input shaft may be coupled to low speed PTO 35 by way of a second coupler (not shown).

Figure 2:
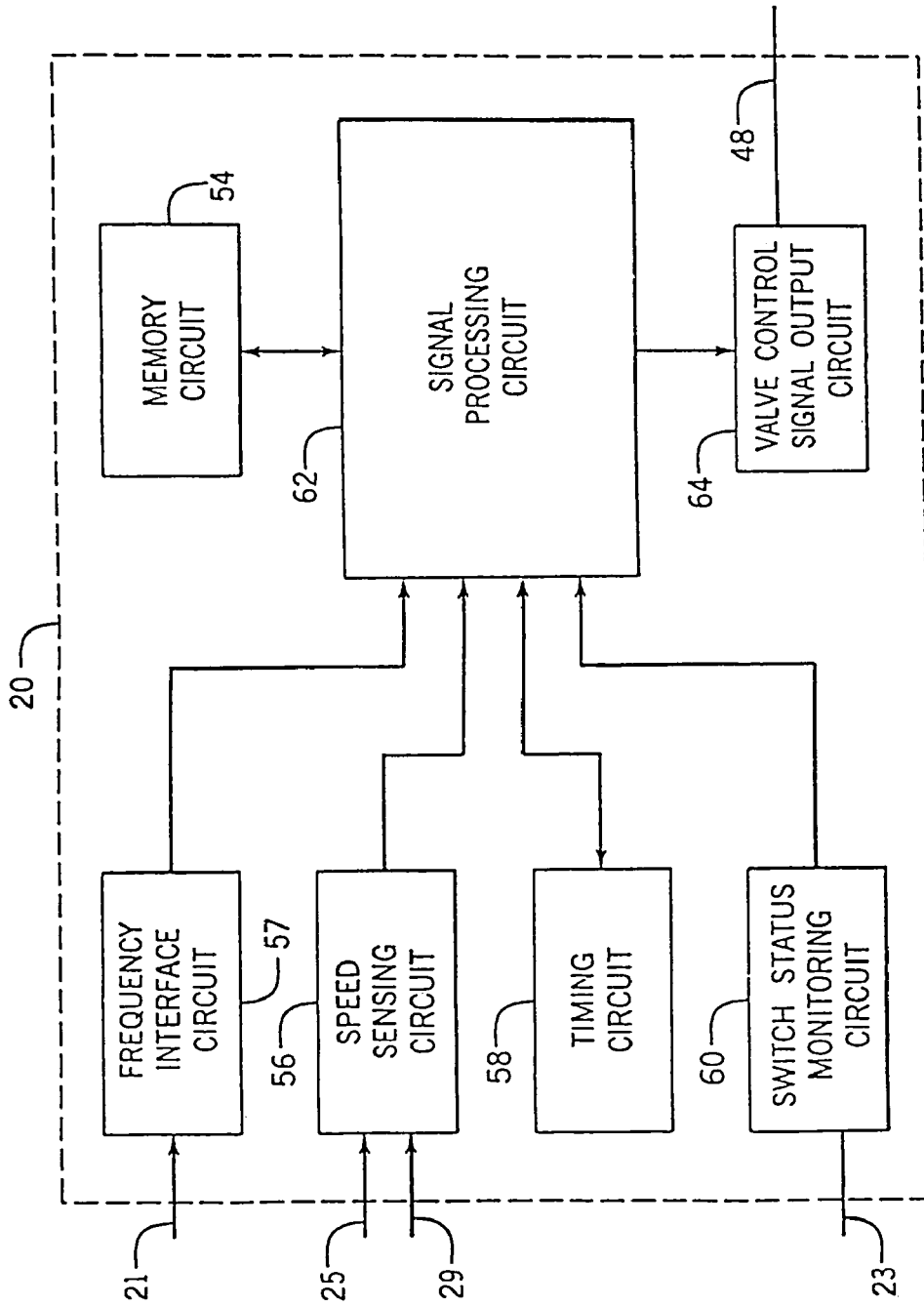
FIG. 2 is a schematic block diagram representative of the circuit configuration for a controller of the control system.

Referring now to FIG. 2, controller 20 is depicted as including a memory circuit 54 (which may include RAM and ROM) and/or as being configured or programmed to provide the operations of a speed sensing circuit 56, a timing circuit 58, a switch status monitoring circuit 60, a signal processing circuit 62, and a valve control signal output circuit 64. The direction and channels for data flow between circuits 54, 56, 57, 58, 60, 62 and 64 are shown in FIG. 2. The ROM of memory circuit 54 stores those values required for system 10 initialization and the constants required for the operation of certain programs run by controller 20. The RAM of memory 54 provides the temporary digital storage required for controller 20 to execute the system program. While, at the present time, memory such as RAM and/or ROM is preferred, memory need not be limited to such types, and other memory types, including for example, chemical, optical, bubble, and biological, can also be utilized as may be appropriate.

It will be appreciated by those skilled in the art, that, although reference has been made hereinabove to various circuits and memory and to operations described and discussed with reference thereto, such referenced circuits and their operations, including operations as discussed and described hereinafter, may, in various embodiments, be considered to be encompassed within or associated with a programmed or programmable processor or microprocessor and its associated memory and input and output circuitry. In such regard, and with particular regard to various embodiments of control system 10, actions associated herein with various circuit portions of controller 20 may thus be effectively carried out or accomplished in accordance with the programming of a microprocessor or other control device or mechanism or by other devices or mechanisms so connected as to operate in a like or similar manner to perform the necessary actions.

Frequency interface circuit 57 and speed sensing circuit 56 receive signals from alternator 16 and transducer 26 that are applied to conductors 25 and 29, and convert the signals to digital values representative of the rotational speeds of engine 14 (or input shaft 19) and output shaft 32, respectively. (In alternative embodiments, speed sensing circuit 56 may receive signals from transducer 24 that are applied to conductor 25, and convert those signals to digital values representative of the rotational speed of input shaft 19, in place of or in addition to frequency interface circuit 57, alternator 16 and conductor 21.) Insofar as the output of alternator 16 is a square-wave, frequency interface circuit 57 may operate as a timing interface that measures the time between pairs of edges of the square wave.

Figure 3A:
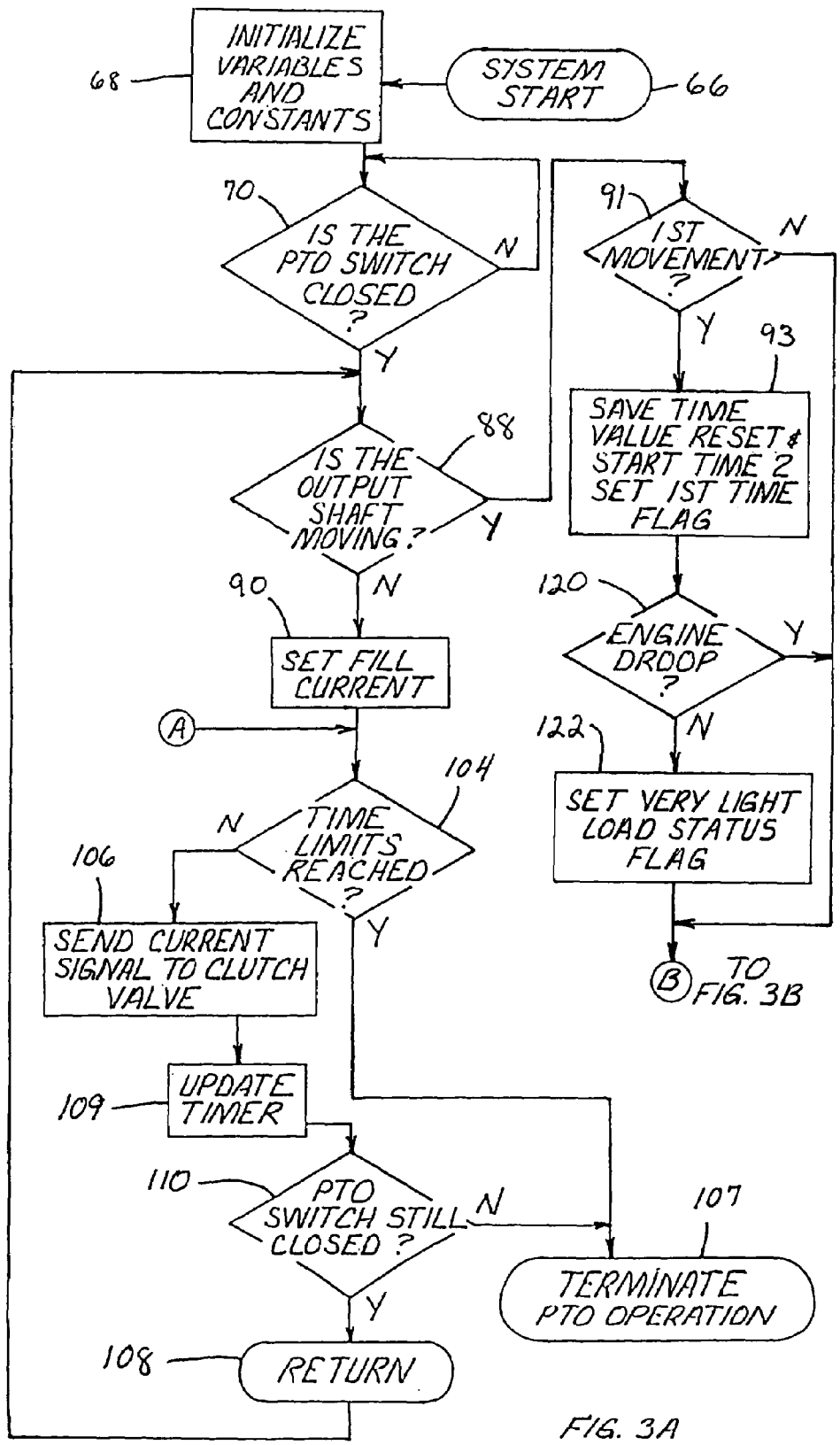
FIGS. 3A and 3B are flowcharts representative of the general sequence of operation of a control system embodiment.
Figure 3B:
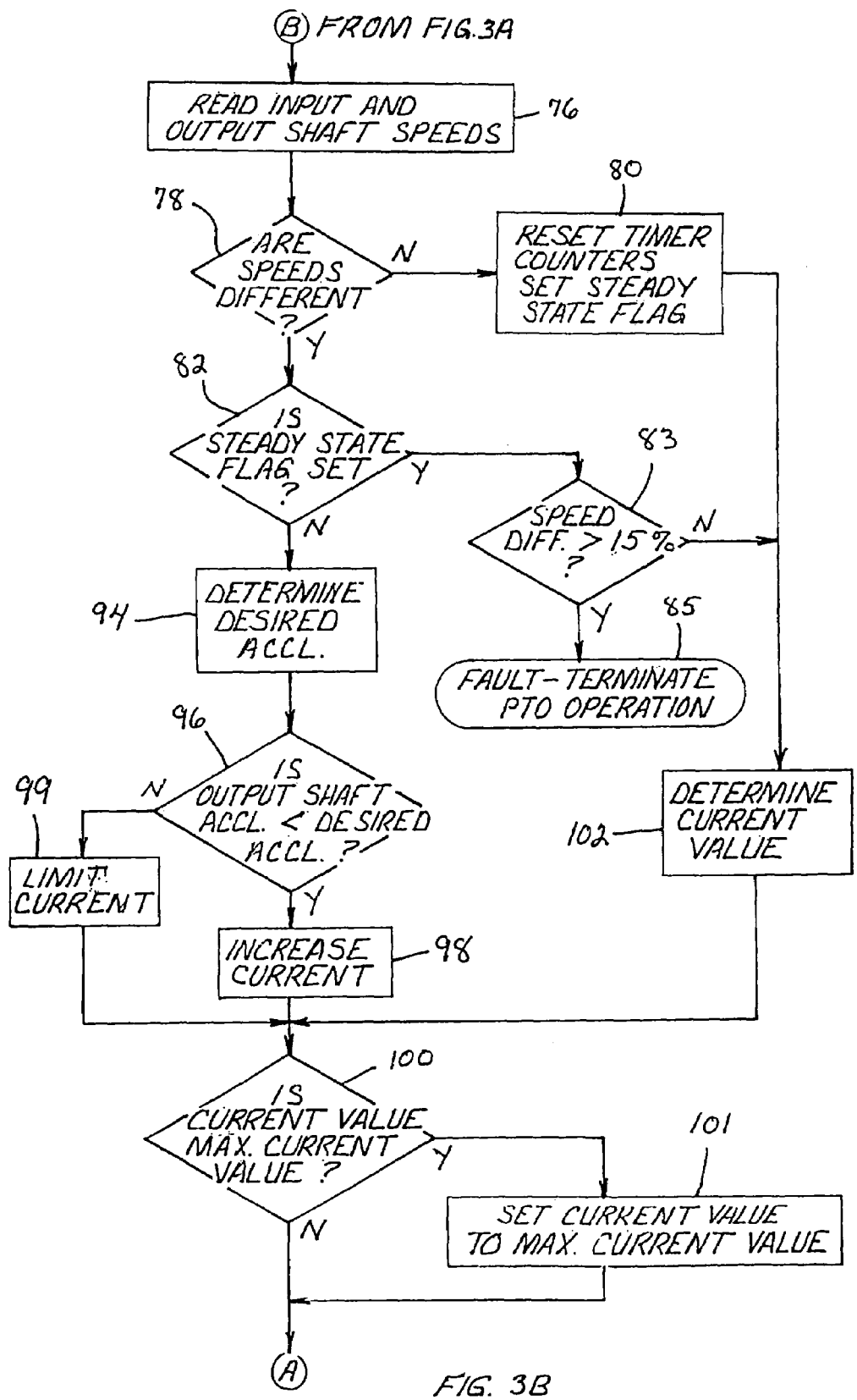

Timing circuit 58 includes counters which are utilized by signal processing circuit 62 while executing the programming represented by the flow charts of FIGS. 3A and 3B.

Switch status monitoring circuit 60 converts the signals applied by switch 22 to conductor 23 to digital values representative of the status of these switches.

Valve control signal output circuit 64 produces an analog signal, such as an analog current signal, applied to the solenoid of valve 28 via conductor 48 and isolation circuit 44, having an appropriate magnitude.

Figure 4:
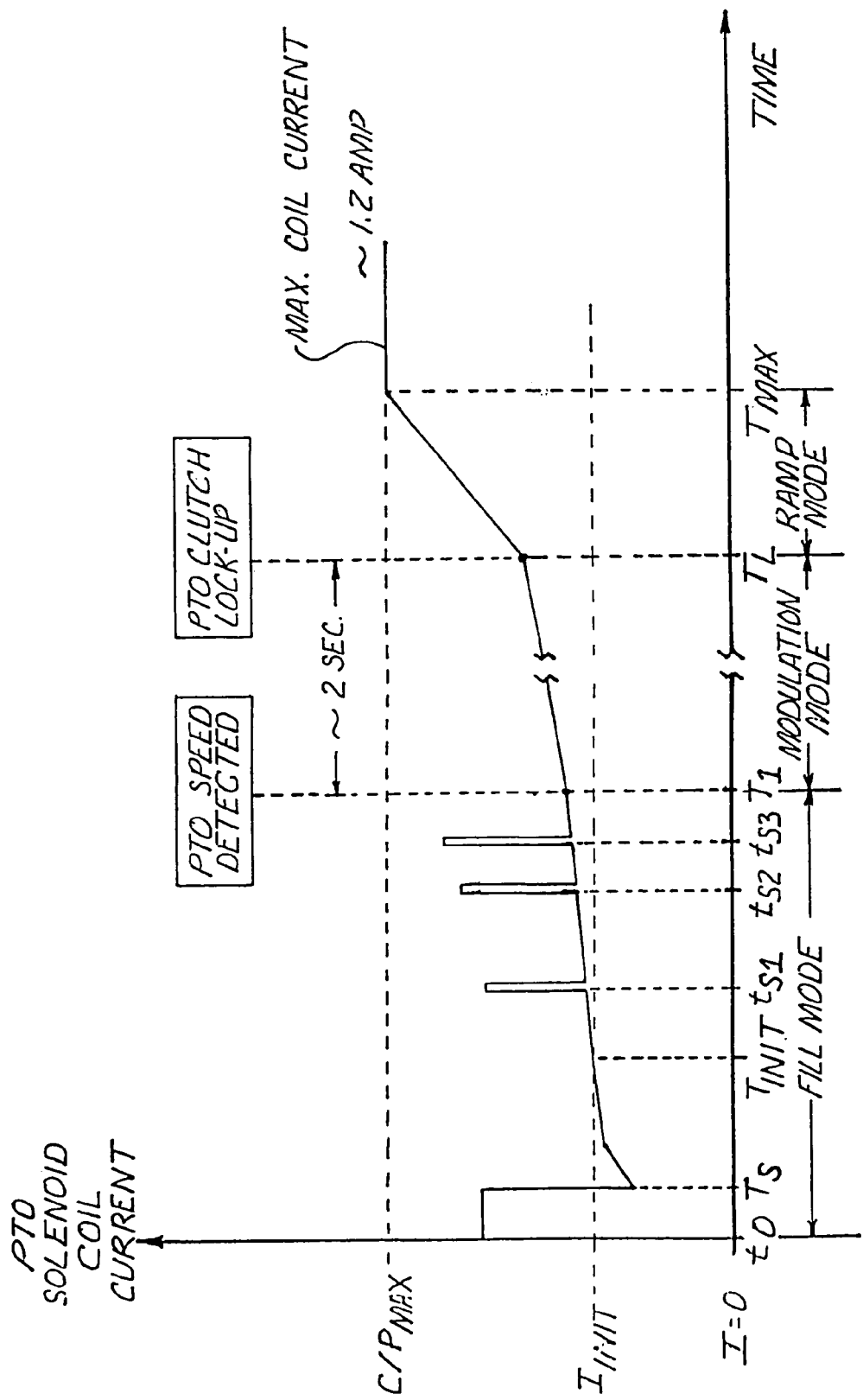
FIG. 4 is a graphical representation of a particular application of current/pressure control signals to the hydraulic valve of the control system over a period of time.

As is briefly discussed below, the program executed by controller 20 is preferably executed at 100 Hz (although, in alternate embodiments the program could be executed at other frequencies). (In an alternate embodiment in which valve 28 is provided with a PWM current or voltage signal, valve control signal output circuit 64 would produce a 400 Hz PWM current or voltage signal having an appropriate pulse width. Assuming the same program execution frequency of 100 Hz, the pulse width of the signal from circuit 64 would be updated every 10 milliseconds or every 4 cycles of the PWM signal.) FIGS. 3A and 3B depict a representative operational sequence of a PTO engagement and operation such as might occur with the system of the present invention, and FIG. 4 illustrates the effects of such an operational sequence. Basically, there are three sequential modes of electrical signal modulation of the PTO valve, designated as the FILL MODE, the MODULATION MODE and the RAMP MODE, which are indicated along the horizontal axis in FIG. 4. The vertical axis in FIG. 4 represents the PTO valve current in units of amps, and the horizontal axis represents time. Typically, the PTO module modulates the valve by varying analog current to the coil. Superimposed on the control current is a fixed frequency dither signal. FIG. 4 is a representational figure whose purpose is to illustrate certain features, and is therefore not necessarily to scale.

$I_{INIT}$ shown in FIG. 4 is the current level at which a PTO solenoid coil is cracking the PTO valve open just enough for the PTO clutch to start carrying torque. The value of this current level comes from PTO calibration which may be predetermined or otherwise established in various ways. The value of such current is typically between 200-400 ma.

Time $t_{S1}$ in FIG. 4 is the time at which the PTO control current reaches $I_{INIT}$, typically around 500 ms.

In a more preferred form, the FILL MODE may be considered to have three identifiable stages: VALVE WAKE-UP, GENTLE INCREMENT, and LOW ENERGY SHOCKS. The system is hereafter described with reference to the more preferred form of a FILL MODE, although it should be recognized that the present invention can also be employed with a more basic FILL MODE that does not employ as many differentiable stages but which nevertheless effects over some time period an increase in applied torque between the input and output shafts to effect initial movement of the output shaft. Regardless of form, FILL MODE is considered to begin at $t_0$ with PTO speed at zero when PTO switch 22 is closed and to end when PTO speed (output shaft movement) is detected, such as at $T_f$. The time at which PTO speed is detected is the start of the MODULATION MODE.

In its preferred form, the FILL MODE preferably starts with a VALVE WAKE-UP stage. The waking up current is typically about 200 ma above $I_{INIT}$. The duration of such stage may be made to depend upon how long the PTO has been in OFF state, and may typically be set, as indicated below:

| PTO off time | Wake-up duration |
| --- | --- |
| <=500 msec | 0 |
| >500 msec | 10 msec |
| >800 msec | 20 msec |
| >1200 msec | 30 msec |
| >2000 msec | 40 msec |
| >4000 msec | 60 msec |
| >6300 msec | 70 msec |

Utilization of a VALVE WAKE-UP stage speeds up the filling up of the PTO valve and conditions the valve to be ready to carry torque.

After valve wake-up, the current will preferably drop to about 40 ma below $I_{INIT}$ and thereafter quickly enter the GENTLE INCREMENT stage. During such stage, the current keeps increasing, generally gently after, perhaps, a more pronounced initial increment, until either 1.5 seconds has passed or PTO speed is detected, with the current to the PTO valve typically increasing by approximately 0.03% of maximum current every 10 ms. It has been found desirable to increment the current so that, by time $T_{INIT}$, the current will typically have reached $I_{INIT}$, and that, after approximately 1.5 seconds, the applied current will typically be about 40 ma above $I_{INIT}$. If no PTO shaft speed has been detected by such time, the FILL MODE will then enter the LOW ENERGY SHOCKS stage.

Previously known systems, while they may have utilized a WAKE-UP stage and/or a GNETLE INCREMENT stage during FILL MODE, have not made use of a LOW ENERGY SHOCKS stage. It has been found desirable to include such a stage in the FILL MODE because some implements require the application of higher current to the valve in order to break the implement loose (e.g., frictions, heavy static loads, etc.), but lower current to ramp up speed. During the LOW ENERGY SHOCKS stage, low energy shocks, such as roughly 10 Hz pulses riding the base current increment, may be applied to more readily break loose the implement and to effect movement of the output shaft. The amplitudes of such pulses preferably starts from about 10 ma and gradually increases to about 50 ma.

It has been found that, after approximately 3.6 seconds, the torque capacity should typically be about enough to kill the engine. If no PTO shaft speed is detected by that time, and the engine has not been killed, the software will preferably stop the FILL MODE and terminate the PTO operation. The operator will then need to re-initialize the system, such as by turning the PTO switch Off and then back On to restart the PTO.

If, at any time during the FILL MODE, PTO shaft speed is detected, the FILL MODE ends and the MODULATION MODE starts.

The operation of controller 20, especially with regard to the more preferred form of FILL MODE, will now be described in greater detail with reference to FIGS. 3A and 3B (FIGS. 3A and 3B represent the operational steps of the program run by controller 20.) Upon system startup at step 66, controller 20 reads the ROM of memory circuit 54 and initializes the counter in timing circuit 58. Controller 20 also initializes those other variables and constants which may be utilized in the programming of controller 20 as it proceeds to and through step 68.

At step 70, controller 20 checks the digital value representative of the status of PTO on/off switch 22, such as is available from switch status monitoring circuit 60, and remains in a loop back to such step if switch 22 is not detected as being closed. Once switch 22 is detected to be closed, operation will then advance to step 88 and proceed to execute the steps required to begin (or continue) engagement of clutch 18.

At step 88, by checking the value representative of the rotational speed of output shaft 32, controller 20 determines whether or not shaft 32 is moving, and proceeds to step 90 if the output shaft 32 is not moving or to step 91 if the output shaft 32 is moving.

If the output shaft 32 is not moving and operation has proceeded to step 90, the system is in its FILL MODE of operation and controller 20 sets a fill current value, which is dependent, in part, upon the particular time count.

In general, at step 90 the fill current value may be set in accordance with a predetermined current/pressure control curve, such as has been discussed generally hereinabove, but at specific times during the LOW ENERGY SHOCKS stage the current value will be increased so as to provide a current shock to the clutch system. By way of example, at other than the specific times for application of current shocks, controller 20 may read the time associated with the times since the PTO switch was closed, such as from a timer counter of circuit 58, and set the current magnitude value to a predetermined percentage if switch 22 has been closed less than a given time. If the time is greater than that given time, the current magnitude value may be increased by 0.1% for each 10 ms increment of time elapsed subsequent to switch 22 being closed for that given time. (In an alternative embodiment, the pulse width may be set to a predetermined percentage (e.g., 20%) of the maximum pulse width value if switch 22 has been closed for 300 ms or less. If the time is greater than 300 ms, the pulse width value may be increased by 0.1% for each 10 ms increment of time elapsed subsequent to switch 22 being closed for 300 ms.)

Figure 6:
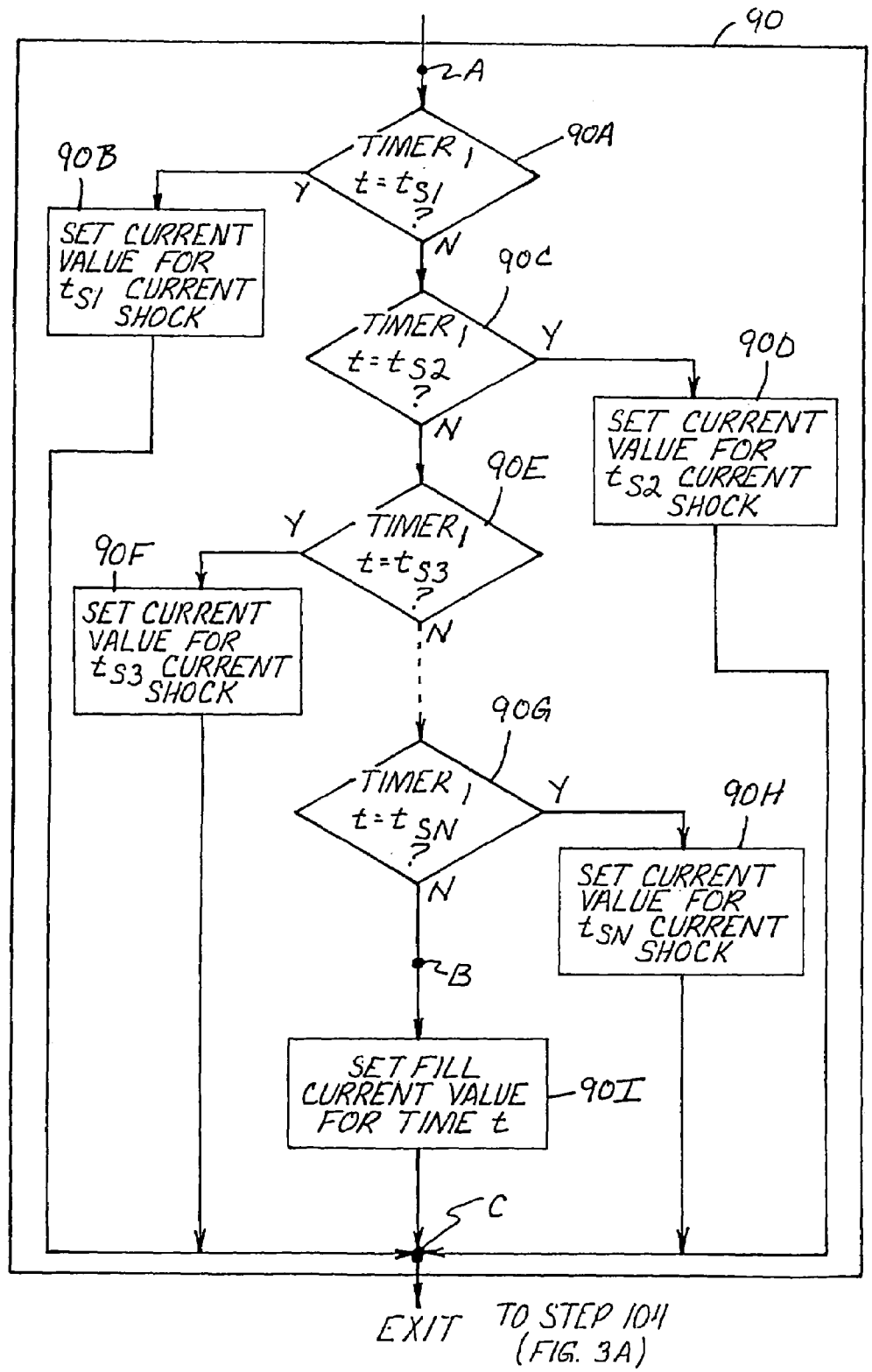
FIG. 6 is a flowchart representative of one embodiment of the functionality of step 90 of the flowchart of FIG. 3A.

At the specific times at which current shocks are to be applied, the current values are set to a significantly higher value than would otherwise be the case. FIG. 6 is a flowchart setting forth one embodiment of a more detailed operational sequence of step 90 of FIG. 3A, showing how the current shock values, such as the increased magnitude of the current, can be set to occur at times $t_{S1}$, $t_{S2}$, $t_{S3}$, and $t_{SN}$. Although only a single shock is depicted in FIG. 4 at such times, it should be appreciated that application of a series of shocks commencing at such times is also possible and preferable.

When no movement of the output shaft 32 has been detected at step 88 and the engagement operation has progressed to step 90, then with particular reference to FIG. 6, at step 90A controller 20 checks whether the then-current time is time $t_{S1}$, the time at which a first current shock is to be applied if the output shaft 32 has not commenced movement by that time. If the time t is $t_{S1}$, controller 20 proceeds to step 90B where it sets the current value to be used in applying the current shock at time $t_{S1}$ before proceeding through point C of FIG. 6 to step 104 of FIG. 3A.

If, at step 90A, the then-current time is not equal to $t_{S1}$ controller 20 proceeds to step 90C where it next checks whether t is equal to $t_{S2}$, the time at which a second current shock is to be applied if the output shaft 32 has not commenced movement by that time. If the time t is $t_{S2}$, controller 20 proceeds to step 90D where it sets the current value to be used in applying the current shock at time $t_{S2}$ before proceeding through point C of FIG. 6 to step 104 of FIG. 3A.

If, at step 90C, the then-current time is not equal to $t_{S2}$, controller 20 proceeds to step 90E where it next checks whether t is equal to $t_{S3}$, the time at which a third current shock is to be applied if the output shaft 32 has not commenced movement by that time. If the time t is $t_{S3}$, controller 20 proceeds to step 90F where it sets the current value to be used in applying the current shock at time $t_{S3}$ before proceeding through point C of FIG. 6 to step 104 of FIG. 3A.

If, at step 90E, the then-current time is not equal to $t_{S3}$, controller 20 can proceed to other steps such as step 90G, if the system is designed to provide additional current shocks at other times, or, if no additional current shocks are to be applied with a particular system, to step 90I. At step 90G, controller 20 checks whether t is equal to $t_{SN}$, the time at which an Nth current shock is to be applied if the output shaft 32 has not commenced movement by that time. If the time t is $t_{SN}$, controller 20 proceeds to step 90H where it sets the current value to be used in applying the current shock at time $t_{SN}$ before proceeding through point C of FIG. 6 to step 104 of FIG. 3A. If t is not equal to $t_{SN}$ at step 90G (or to a value of t at any of steps 90A, 90C, or 90E, if the system is designed to apply fewer than 2, 3, or N shocks, respectively), controller 20 proceeds to step 90I where it sets the fill current value for time t in a manner such as has been previously explained hereinabove with reference to step 90 of FIG. 3A before proceeding through point C of FIG. 6 to step 104 of FIG. 3A.

Figure 10:
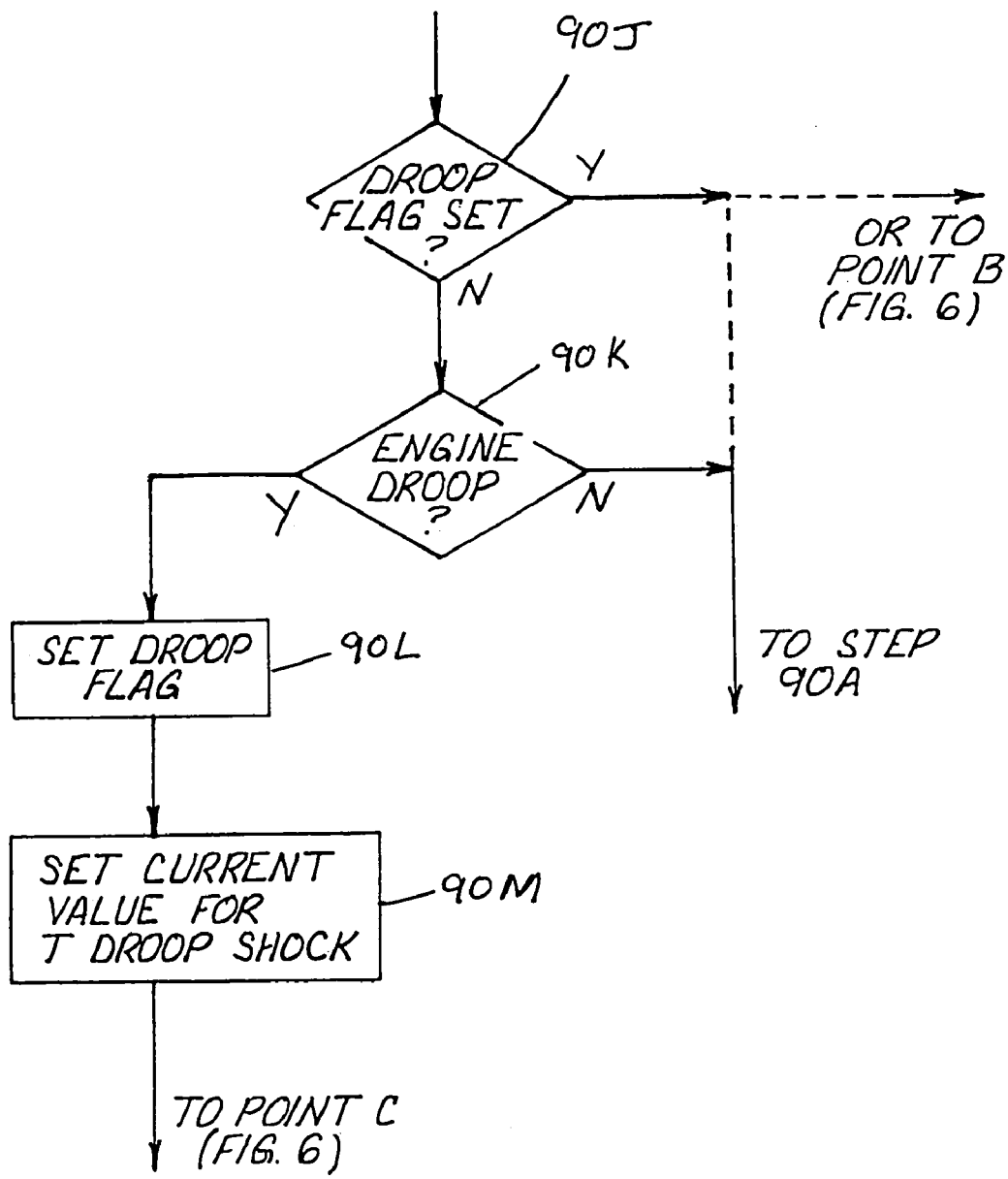
FIG. 10 is a flowchart representative of an additional operational steps that may be included in a point A in the operational sequence in FIG. 6.

FIG. 10 is another flowchart setting forth an optional feature that may be included within the operational sequence of FIG. 6, including additional steps at point A of FIG. 6, showing how a current shock value can be triggered by detection of engine droop prior to detection of movement of output shaft 32. As shown in FIG. 10, upon reaching step 90 (in FIG. 3A), and before proceeding to step 90A, controller 20 may first determine whether a DROOP flag has been set. If such a flag has been previously set, the controller may proceed, for example, either to point B of FIG. 6 or to step 90A of FIG. 6, depending upon particular systems.

If, however, DROOP flag has not been previously set, controller 20 proceeds to step 90K, where it checks to see if any engine droop (or a degree of engine droop) is detected. If not, controller 20 proceeds to step 90A on FIG. 6; if so, it proceeds to step 90L.

At step 90L, controller 20 sets the DROOP flag before proceeding to step 90M, where controller 20 sets a current shock valve to be applied, at $t=T_{DROOP}$, before proceeding to and through point C of FIG. 6 to step 104 of FIG. 3A.

Once the current value for time t has been set at step 90, such as at steps 90B, 90D, 90F, 90H, or 90I of FIG. 6 or step 90M of FIG. 10, operation then proceeds to step 104 (FIG. 3A), which step will be further addressed at a later point hereinafter.

From the foregoing discussion and description, it should be understood that a purpose of steps 88 and 90 is to effect smooth engagement of PTO clutch 18. A certain volume of hydraulic fluid must be provided to PTO clutch 18 before the clutch plates of PTO clutch 18 travel through the distance required to engage the clutch plates. During a clutch filling process, it is undesirable to apply hydraulic fluid to the clutch at a fixed or undesirably high pressure since the clutch will abruptly apply torque from input shaft 19 to output shaft 32. Such an abrupt application of torque can potentially cause damage to output shaft 32 or an associated implement connected to the PTO output shaft. By initiating the filling of clutch 18 with a pressure equivalent to the pre-stress force applied by the clutch springs, and by applying current to the valve to effect a controlled filling of clutch 18, the clutch plates can be made to move relatively slowly toward engagement, and the pressure can be controllably increased gradually until engagement. This process prevents the abrupt transfer of torque from input shaft 19 to output shaft 32.

As is depicted in a somewhat idealized form in FIG. 4, following valve wake-up at time $t_0$, the current/pressure applied over time from $T_S$ starts at a lower level and increases in accordance with the current fill values established at step 90 until time T1, when the first motion of the output shaft 32 occurs and is detected at step 88. During the period between to and T1, at times $t_{S1}$, $t_{S2}$, and $t_{S3}$, current shocks are shown as having been applied, consistent with current values as set at steps 90B, 90D, and 90E. As shown in FIG. 4, application of the current shocks need not occur at equally spaced intervals from one another, but can occur at times selected for and matched to particular systems. As has previously been noted, during such time period from $t_0$ to T1, following initial application of current of a given magnitude for a short duration, it has been found to be advantageous to gradually increment the current, such as by approximately 0.03% of maximum current every 10 ms, until motion of the output shaft 32 is detected. As has previously been explained, the current shocks provide a higher magnitude of current for brief duration at the times of their application.

In alternative embodiments employing PWM signals, the pulse width of the PWM signal may be initiated at a certain duty cycle (e.g. 20%) at time $t_0$ and increased in gradual steps until output shaft 32 begins moving as determined at step 88. At the times when a current shock is to be applied, the pulse width may be expanded to achieve the short duration pressure shock desired at the PTO clutch 18.

Referring now again to FIG. 3A, as has previously been discussed, once the fill current has been set, controller 20 proceeds from step 90 of FIG. 3A to step 104. At step 104, controller 20 checks if the timer has timed out. If so, controller 20 proceeds to step 107 and terminates the PTO operation; if not, it proceeds directly to step 106.

At step 106, controller 20 operates to send the established current value to PTO clutch valve 28 before proceeding to step 109, where it updates the timer before proceeding to step 110. At step 110, controller 20 checks to see if the PTO switch is still closed. If not, controller 20 proceeds to step 107, where the PTO operation is terminated. If the switch is still closed, however, controller 20 proceeds to step 108, which identifies a return to step 88 and commencement of another loop of the engagement operation. (At step 106, for embodiments that use PWM techniques, controller 20 may effect application of a pulse width modulated signal to valve 28 via conductor 48 at a frequency of 400 Hz with a pulse width corresponding to the current pulse width value as set in that particular loop through the operation sequence.)

It will be appreciated that various checks and actions may be associated with RETURN 108 for effecting a conclusion of the operational sequence and cessation of further looping through the sequence, and for securing information or initializing values for further activities, depending upon the system. By way of example, previous speed values for the input and/or output shafts may be saved for future reference, if desired, and new speed values may be read at such step for reference and use upon return of the operation to step 88 and successive steps.

It should be understood that the foregoing discussion has now described the loop operation from step 88 through RETURN step 108 and back to step 88, which looping operation occurs during the FILL MODE. The controller 20 causes the timer counter to be updated by a specified amount upon each passage through step 109, which amount is related to the time it takes to cycle through the operational loop. (For the programming represented by the flow charts of FIGS. 3A and 3B, running at a rate of approximately 100 Hz, one cycle is approximately 10 ms. Accordingly, for one cycle, the counter is updated by a count value associated with 10 ms.)

Referring again to FIG. 3A, upon a looping pass through step 88, if shaft 32 is detected to be (already) moving, FILL MODE ceases and system operation enters (or continues) with either the MODULATION MODE or RAMP MODE of operation as controller 20 proceeds to step 91 instead of to step 90.

Before proceeding with a discussion of the operation of controller 20 during MODULATION MODE, it should first be recalled that MODULATION MODE is that time period when torque has begun to be transmitted until clutch lock-up occurs, and that the system is attempting to smoothly, yet fairly rapidly, achieve such lock-up, starting with a condition in which the output shaft speed is essentially zero and proceeding to a condition in which the output shaft speed is essentially equal to that of the input shaft (and the engine).

In the past, in some systems, desired acceleration was set as a fixed target, and was viewed as or considered to effectively be a (or a set of) straight line control curves from a zero output shaft speed to the full desired speed over a fixed time interval (typically 2 seconds). A drawback of such systems is that they treat different load and acceleration conditions the same.

Ideally, a shaft that has been lagging behind for a certain time should be given a higher acceleration target as time goes by, while a shaft that has over-accelerated should be given a lower acceleration target. Even in a normal load condition, when the shaft has been neither lagging nor over-accelerating, it is considered preferable to set the desired acceleration lower at the early acceleration stage, so as to have a smooth start, and higher at a later acceleration stage, so as to reach the desired full speed in a timely fashion. Such acceleration will exhibit lower physical stresses on both the implement and the vehicle.

With this in mind, in the present system the desired acceleration is preferably set as a dynamic target, although such dynamic targeting may not be necessary for achievement of some of the broader aspects of the present invention. As presently preferred, the desired acceleration may be considered to be a curve, which is flatter at the beginning and becomes steeper at the end. In general, as will be discussed further hereinafter, in accordance with the preferred manner of operation, a timer (TIMER2) is reset when output shaft movement is first detected and is thereafter updated as MODULATION MODE proceeds, with the maximum time for achieving clutch lock-up set at 3 seconds. At the time of first output shaft movement ($T_1$,), a desired acceleration is initially determined using an acceleration time value $t_{ACC}$ of 2.3 seconds. The acceleration time values used at later times for subsequent determinations of (updated) desired acceleration values preferably are determined according to the formula $t_{ACC}=(2.3-((TIMER2)/2))$. Thus, the acceleration time value employed at a time 1.0 second after initial movement of the output shaft would be $t_{ACC}=(2.3-((1.0)/2))=(2.3-0.5)=1.8$ seconds, while the acceleration time value employed at the conclusion of the 3 second maximum time period for achieving lock-up would be $t_{ACC}=(2.3-((3.0)/2))=(2.3-1.5)=0.8$ seconds. Consequently, as time passes, the curve tends to become steeper. Since the acceleration is a function of the speed changes over time, the continuing decrease of the acceleration time value will tend to effect higher and higher acceleration targets and, as a consequence, a requirement for the application of increasingly greater current values to the clutch.

Referring now, again to FIG. 3A, at step 91, if the movement detected at step 88 is the first movement of the output shaft, MODULATION MODE commences and controller 20 proceeds to step 93 where it saves the time of such detected movement as TIMER1, resets and starts a timer for TIMER2, and sets a $1^{ST}$ TIME flag before proceeding to step 120. If the detected movement is not the first movement of the output shaft, controller 20 instead proceeds through point B of FIGS. 3A and 3B to step 76 of FIG. 3B.

If the movement detected at step 91 is the first movement and operation has proceeded through step 93 to step 120, at step 120 controller 20 checks to see if engine droop (or a degree of engine droop) has occurred at that time. Typically this may take the form of determining whether the difference between a previous (nominal) engine speed value and the current engine speed value is within or without an established deviation value. If the difference exceeds the established deviation value, such finding is indicative of the application of a significant enough load to the engine as the output shaft begins to move that the load is considered to be other than a very light load or an associated over-running clutch. In such instance, controller 20 proceeds through point B of FIGS. 3A and 3B to step 76 of FIG. 3B. On the other hand, if the difference is within the deviation value, such finding is considered indicative of the existence of either or very light load or an associated over-running clutch, and controller 20 then proceeds to step 122.

At step 122, controller 20 sets a VERY LIGHT LOAD status flag before proceeding through point B of FIGS. 3A and 3B to step 76 of FIG. 3B.

The lack of engine droop detected at step 120 when first movement of the output shaft is detected at step 91 is significant because such determinations, in combination, identify reactions encountered when the load that is applied is very light or when an over-running clutch has been encountered and the locking pins of such over-running clutch have not yet engaged the locking notches of such over-running clutch, in which situations the initially detected load on the PTO output shaft presents little initial resistance to the applied torque through the PTO clutch and little loading of the engine.

Detection of movement of the output shaft at step 88 and determination of first movement at step 91 is significant because such actions identify the conclusion of the FILL MODE and the commencement of the MODULATION MODE. As is depicted on FIG. 4, MODULATION MODE directly follows the FILL MODE and is initiated when PTO speed (output shaft movement) is first detected. After detection at $T_1$ of PTO shaft speed, controller 20 modifies the analog command signal to the valve based on acceleration of the PTO clutch until PTO CLUTCH LOCK-UP occurs (i.e., when PTO clutch slip meets the criteria for a locked clutch condition) at $T_L$.

In general, during the period between PTO speed detection and clutch lock-up, the analog command signal is typically adjusted depending upon the relationship between the calculated acceleration of the PTO clutch compared to the target acceleration value. Controller 20 monitors engine rpm and typically assumes it will be constant for the next 2 seconds. From engine speed, the controller then typically calculates the PTO acceleration required to achieve PTO clutch lock-up within approximately 1.8 seconds. If the acceleration is lower than the target acceleration value, the control current will be increased accordingly unless the engine rpm has been loaded too low. If the acceleration is higher than the target acceleration value, the control current will be decreased accordingly in the early stage of modulation. Typically, if modulation has been in process for over 1 second, or the PTO has been turned on for over 4 seconds, or the clutch slippage is less than 50%, the control current will not be decreased even if the acceleration is higher than the target acceleration value, although these features may be altered depending upon particular systems and users.

A recognized difficulty with such procedure is that the engine speed will rarely, if ever, remain constant for 2 seconds, but will, in actuality, vary over such time, perhaps drastically, as would be the case when an associated over-running clutch locks up after a short period of lock-up delay. If output shaft movement occurs without appreciable engine droop or the PTO shaft speeds up fairly quickly and without appreciable engine droop, the controller recognizes such conditions (such as at steps 120 and 122) as being indicative of a no load or very light load condition, which could also initially signify possible use of an over-running clutch. It has been found desirable to employ an even more gentle current modulation in such instances to accommodate the possibility that an over-running clutch is associated with the output shaft, and the manner in which this accomplished will be further addressed hereinafter.

With the foregoing in mind, when operation proceeds to step 76 of FIG. 3B, controller 20 obtains the digital values representative of the rotational speeds of input shaft 19 (or engine 14) and output shaft 32 (which may be the some of the same values as utilized in steps 88 and 120), such as provided to signal processing circuit 62 from circuits 56 and 57, and proceeds to step 78, where it then compares the speeds of shaft 19 (or engine 14) and shaft 32, and, depending upon such comparison, proceeds either to step 80 or step 82.

If the shaft speeds are the same (or are within some degree of tolerance of the speeds or proportions thereof), signifying that PTO clutch lock-up has occurred, as will be further discussed hereinafter, MODULATION MODE terminates, RAMP MODE commences, and operation proceeds to step 80.

However, if, at step 78, the shaft speeds are not the same (or are not within some degree of tolerance of the speeds or proportions thereof), which is the expected situation when output shaft movement is first detected and MODULATION MODE commences, operation proceeds instead to step 82, where controller 20 checks to see whether or not the STEADY STATE flag has been set, (signifying that PTO clutch lock-up had previously occurred). During MODULATION MODE, the STEADY STATE flag will not as yet have been set and controller 20 will therefore proceed to step 94.

The tolerance level at step 78 may be dependent, in part, upon the TIMER2 value reset at step 93 and may be set to such a level to ensure, for example, in the case of an associated over-running clutch, that speeds will not be considered the same during a possible lock-up delay period of the associated over-running clutch. Alternatively, controller 20 could be configured or programmed to bypass steps 76, 78, and 82 and to instead proceed directly to step 94 for a short but sufficient period of time following the setting of the VERY LIGHT LOAD status flag in order to ensure completion of any lock-up delay period before a determination is made at step 78 that the speeds of the input and output shafts of the PTO clutch have been equalized.

At step 94, controller 20 then sets a desired acceleration, which acceleration may, in some instances and with certain embodiments, be calculated once, upon a first pass through step 94 during a PTO engagement operation and thereafter relied upon in subsequent passes through step 94 during such engagement operation, and in other instances and with other embodiments, be recalculated in subsequent passes through step 94 in an engagement operation. By way of example, the desired acceleration, whether calculated once or multiple times, may be calculated such as by dividing the speed of the input shaft 19 at the time of calculation by 2 seconds.

In general, the first pass through step 94 is the start of the process for controlling clutch 18 to accelerate output shaft 32 relative to input shaft 19 until the speed of output shaft 32 reaches its steady state speed (no clutch 18 slip) which equals or is proportional to the speed of input shaft 19. The desired acceleration of output shaft 32 at step 94 is preferably calculated based upon approximately 1.8-2.0 seconds, which has been selected, based upon experimentation, to generally provide optimum acceleration of output shaft 32. However, depending upon the system configuration, such time period may be varied according to the particular tractor and PTO application. The calculated acceleration serves as a reference for accelerating output shaft 32 relative to input shaft 19 at step 96.

It will be appreciated that by selecting a longer acceleration period a flatter, more gentle control curve can be obtained and that by selecting a shorter acceleration period a steeper control curve can be obtained. With this in mind, it will also be appreciated that use of a flatter, more gentle control curve instead of a steeper control curve is initially desirable for certain extreme load situations, such as when an associated over-running clutch is employed. because it will allow a slower acceleration during the lock-up delay period and a consequent less abrupt reaction when the over-running clutch locks up and the "true" load is absorbed by the engine. One manner of addressing the possibility of an over-running clutch in a detected very light load situation is thus to establish, at least initially, a flatter, more gentle control curve during the MODULATION MODE than would otherwise be provided. Further discussion of how this is accomplished with the present invention will be provided hereinafter.

As is apparent from FIGS. 3A and 3B and as will be readily understood by those skilled in the art, and as is discussed in U.S. Pat. No. 6,267,189, the PTO clutch control system can repeatedly set a new, updated desired acceleration as it passes through step 94. As is evident from a study of FIGS. 3A and 3B, so long as the speeds of input shaft 19 and output shaft 32 remain different (as determined in step 78), the control system program repeatedly cycles through step 94. In embodiments in which the desired acceleration is recalculated each time the PTO clutch control system cycles through step 94 (instead of only the first time), the desired acceleration may be repeatedly calculated by dividing the current speed of shaft 19, or another quantity related to engine speed, by the desired time of engagement, which is preferably, partly for convenience of discussion, 1.8-2.0 seconds in various of the embodiments and related figures described and discussed herein. Although in alternate embodiments the frequency of recalculation may vary (or the recalculation may occur at a frequency less than the frequency at which the control system program cycles through step 94), it has been found desirable to have the desired acceleration recalculated at the same frequency as the control system program cycles through step 94, which (as stated above) is approximately 10 ms. Such recalculation occurs with sufficient rapidity that the desired acceleration is effectively continuously recalculated to reflect changes in the speed of input shaft 19 (that is, changes in engine speed).

Figure 8:
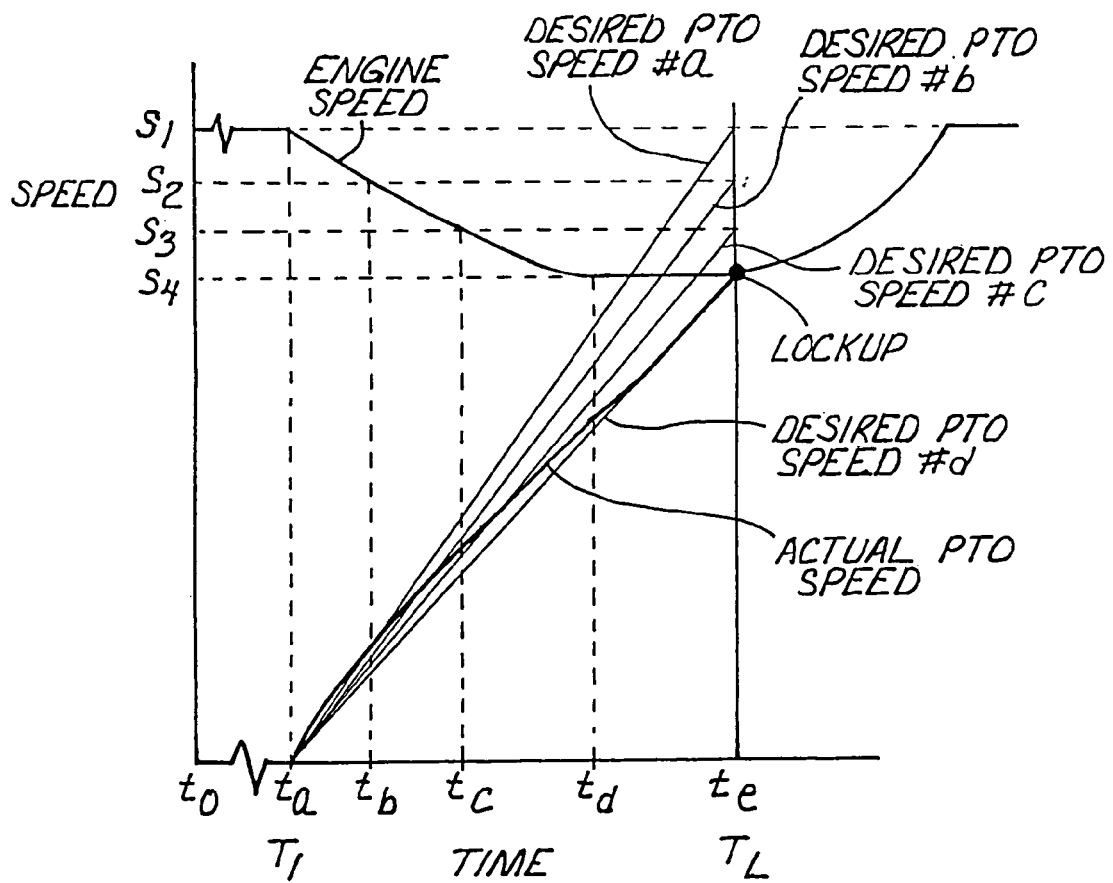
FIG. 8 is a graphical representation of actual and desired speeds of a PTO and engine speed of an agricultural vehicle during engagement of the PTO.

Referring to FIG. 8, examples of the desired and actual speeds for output shaft 32 (i.e., PTO speed), and engine speed (i.e., the speed of input shaft 19), as measured or determined by the PTO clutch control system of an embodiment that recalculates the current desired acceleration during the engagement operation, are plotted against time. Four desired speed curves are shown. The four speed curves are determined based upon the engine speed (or speed of input shaft 19) as measured at four times, $t_a$, $t_b$, $t_c$, and $t_d$ and are labeled as, and referred to below as, respectively, the "desired PTO speed #a", "desired PTO speed #b", "desired PTO speed #c" and "desired PTO speed #d" curves. For convenience, only four desired speed curves are shown in FIG. 8. As discussed above, the desired accelerations in the present embodiment are actually recalculated approximately every 10 ms (effectively continuously), and so FIG. 8 is meant to be a symbolic description of the actual operation of the PTO clutch control system, in which there are many more than four desired speed curves. Also, it is for generality that the four desired speed curves are shown as being calculated at four times (times $t_a$-$t_d$) that are not equidistant from one another. Although alternative embodiments may vary, it has been found desirable to have the desired accelerations (in contrast to FIG. 8) recalculated at a constant frequency as the PTO clutch control system repeatedly cycles through step 94.

Although, for convenience of discussion, the speed curves are shown as being calculated based upon the same time period (from $t_a$ to $t_e$), it should be understood and appreciated that the speed curves could be based upon different periods, such as the $t_{ACC}$ values discussed hereinbefore, and that the basic principle relating to recalculation would still be applicable, and that the particular time periods used for the speed curve calculations may be varied and dependent upon various factors, including such factors as the time t of calculation or load type, for example.

As is depicted in FIG. 8, output shaft 32 begins to rotate at time $t_a$, and the speed of the output shaft equals the speed of input shaft 19 (or the engine speed) at time $t_e$ (lock-up), which corresponds to $T_L$ of FIG. 4. Also, as shown, the speed of input shaft 19 (and of engine 14) does not remain constant as power begins to be transferred to output shaft 32, but, instead, decreases or droops. Consequently if the actual speed of output shaft 32 were to increase in accordance with the desired PTO speed #a curve, which is determined based upon the initial engine speed at time $t_a$, the shaft would attain the speed of input shaft 19 (i.e., the engine speed) in a time significantly shorter than the desired time of engagement (the time interval between times $t_a$ and $t_e$, i.e., 2 seconds). Instead of attaining the speed of input shaft 19 at time $t_e$, the shaft would attain the speed of the input shaft at the time at which, as shown in FIG. 8, the desired PTO speed #a curve crosses the engine speed curve.

The embodiments that repeatedly recalculate the desired acceleration avoid this excessive engagement rate by adjusting the desired speed curve as engine speed decreases. As shown in FIG. 8, at times $t_b$, $t_c$, and $t_d$ the desired acceleration is recalculated (at step 94 of the control system program) and the desired speed curve changes, respectively, to the desired PTO speed #b, desired PTO speed #c, and desired PTO speed #d curves. As described below, with such embodiments the actual acceleration of output shaft 32 is adjusted as the desired speed curve changes (more specifically, the actual acceleration is adjusted based upon the difference between the actual and desired accelerations). Insofar as the actual acceleration of output shaft 32 is adjusted to reflect the new desired speed curves, the output shaft speed increases at a rate such that it will approach the speed of input shaft 19 (i.e., the engine speed) at approximately $t_e$ (i.e., within the desired time of engagement, i.e., 2 seconds), as shown in FIG. 8, and not substantially before $t_e$.

Figure 9:
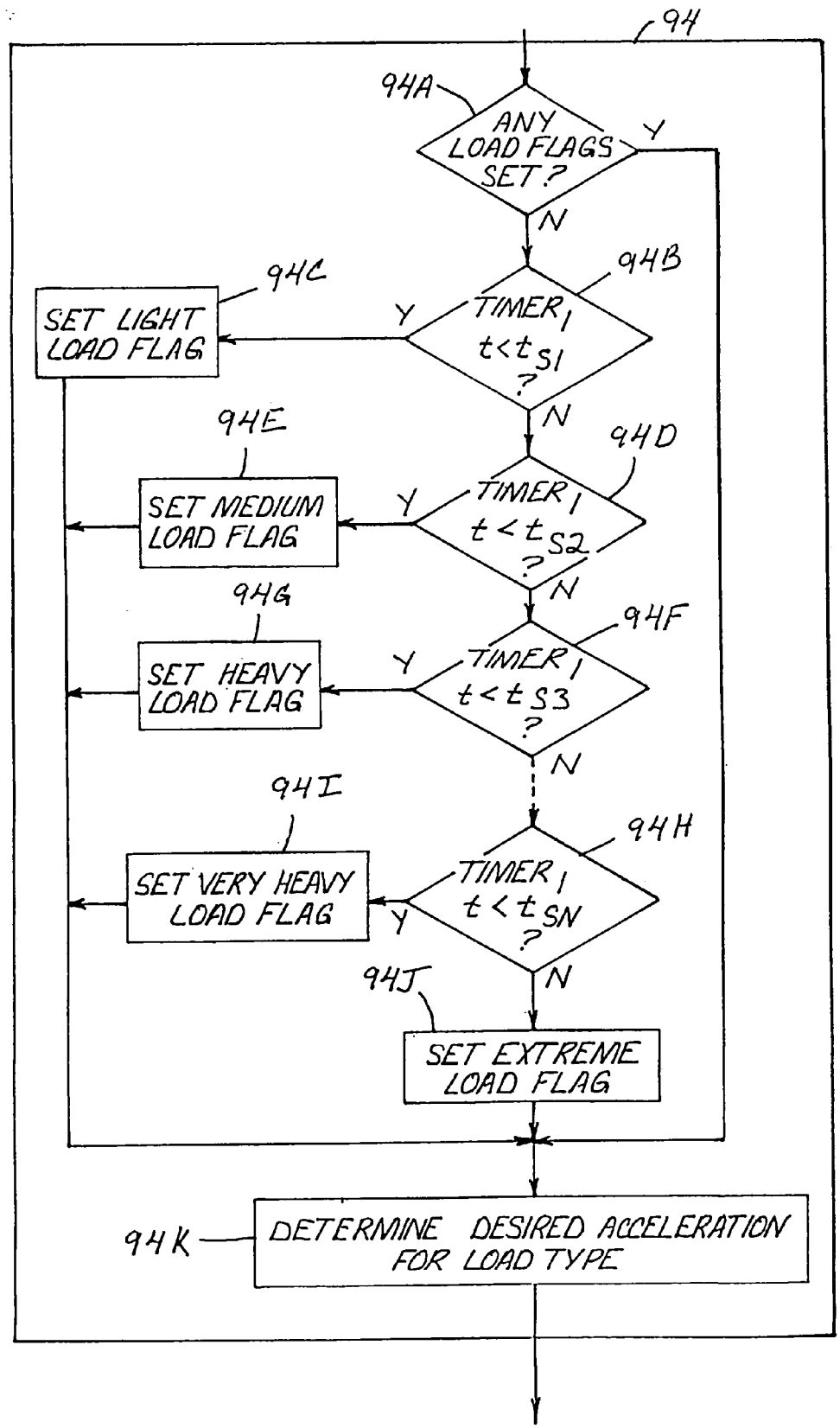
FIG. 9 is a flowchart representative of one embodiment of the functionality of step 94 of the flowchart of FIG. 3B.

From all of the foregoing, it will be appreciated that it is advantageous to be able to utilize different acceleration control curves depending upon the type of load that the PTO is driving. FIG. 9 is a flowchart depicting in greater detail one manner in which this can be accomplished at step 94 in the engagement operation process, not only for very light loads and over-running clutches, but also for other types of loads such as may be establishable, particularly through the use of or in association with the application of current shocks during the FILL MODE.

During MODULATION MODE, controller 20, upon reaching step 94, will, at step 94A, check to determine if any load flags have already been set, such as the VERY LIGHT LOAD status flag set at step 122. If so, controller 20 proceeds to step 94K; if not, it will proceed instead to step 94B.

At step 94B, controller 20 checks whether the saved TIMER1 value is less than $t_{S1}$, the time at which the first current shock was to be applied. If so, the output shaft 32 commenced movement before the scheduled time for the first current shock, as a consequence of which the load is therefore classified as or considered to be a light load, and controller 20 proceeds to step 94C, where it sets a LIGHT LOAD flag before proceeding to step 94K.

If, at step 94B, the saved TIMER1 value is not less than $t_{S1}$, controller 20 proceeds to step 94D, where it checks whether the TIMER1 value is less than $t_{S2}$, the time at which the second current shock was to be applied. If so, the output shaft 32 commenced movement after the scheduled time for the first current shock but before the scheduled time for the second current shock, as a consequence of which the load is therefore classified as or considered to be a medium load, and controller 20 proceeds to step 94E, where it sets a MEDIUM LOAD flag before proceeding to step 94K.

If, at step 94D, the saved TIMER1 value is not less than $t_{S2}$, controller 20 proceeds to step 94F, where it checks whether the TIMER1 value is less than $t_{S3}$, the time at which the third current shock was to be applied. If so, the output shaft 32 commenced movement after the scheduled time for the second current shock but before the scheduled time for the third current shock, as a consequence of which the load is therefore classified as or considered to be a heavy load, and controller 20 proceeds to step 94G, where it sets a HEAVY LOAD flag before proceeding to step 94K.

If, at step 94F, the TIMER1 value is not less than $t_{S3}$, controller 20 can proceed to other steps such as step 94H, if the system is designed to categorize additional load types, or, if no additional load types are to be categorized with a particular system, to step 94K. At step 94H, controller 20 checks whether the TIMER1 value is less than $t_{SN}$, the time at which the Nth current shock was applied. If so, the output shaft 32 commenced movement after the scheduled time for the (N−1)th current shock but before the scheduled time for the Nth current shock, as a consequence of which the load is therefore classified as or considered to be, for example, a very heavy load, and controller 20 proceeds to step 94I, where it sets a VERY HEABY LOAD flag before proceeding to step 94K.

If, at step 94H, the TIMER1 value is not less than $t_{SN}$, the load is classified as or considered to be, for example, an extreme load, and controller 20 proceeds to step 94J, where its sets an EXTREME LOAD flag before proceeding to step 94K.

Upon reaching step 94K, controller 20 then determines the desired acceleration for the load type being driven, such as in the manners previously described relative to step 94 of FIG. 3B or by alternative manners, before proceeding to step 96 of FIG. 3B. Such alternative manners, by way of example, could include the use of a preset curve for one or more load types or control curves included within look-up tables, as well as control curves determined or established by various means in real-time.

At step 96, controller 20 checks to determine whether the output shaft acceleration is less than the desired acceleration that was set at step 94. In order to perform such check, the then-current shaft acceleration must be first calculated, such as based upon the speed of shaft 32 available from circuit 56 at that time and the speed of shaft 32 as monitored during the previous loop and stored in memory, such as at step 76. If an operational loop through step 96 is executed every 10 ms, the shaft acceleration is then the change in shaft speed between program loops divided by 10 ms.

If, at step 96, the actual calculated acceleration of shaft 32 is less than the desired shaft acceleration as set at step 94, operation proceeds to step 98. On the other hand, if the actual calculated acceleration of shaft 32 is greater than or equal to the desired shaft acceleration as set at step 94, operation proceeds to step 99, instead, where the current is limited, before proceeding to step 100.

Both steps 98 and 99 deal with the establishment during MODULATION MODE of current adjustments which are intended to be applied to clutch 18. During modulation of PTO output shaft acceleration, current control curves are generated that are preferably dependent on the load types applied to the PTO output shaft. For lighter loads the current curves will tend to be flatter and for heavier loads steeper. Within the same load type, the rate of current increase will typically depend upon how small the actual acceleration is in comparison to the targeted acceleration (e.g., from ⅔ to ⅙ of the targeted value, as will be further discussed hereinafter), with the increase in current typically ranging from about 0.02% to about 0.1% of maximum current. With over-running clutches, the current increase rate is set appreciably lower (as low as 0.007% of maximum current) than any of such values.

Preferably, even at step 98, labeled as an "Increase Current" block, if it is detected that a drop in engine RPM exceeds a threshold value or that engine droop over time has exceeded a threshold relative to the set engine RPM, the current increase will be halted or even reversed (if within early modulation stage) in accordance with the engine droop rate and/or the amount of RPM droop that has occurred. The engine RPM droop is a reflection of the application loads/torques. The current reduction/limitation will help to reduce the peak torque, avoid over load, and protect the mechanical system.

With more particular reference to step 99, it is also desirable to limit and/or reduce the control command (current or voltage) when the actual acceleration is greater than the targeted acceleration. As expressed in the previous patents, such operations may cause hunting.

Preferably, such a current reduction will only be executed in the early modulation stage, such as within 1 second of shaft movement, and when shaft speed is relatively low, such as when the clutch slippage is over 50%. The current will preferably not be lower than the current which cause the shaft start to turn. If current reduction is called for, the current reduction rate should preferably be slow. Depending on how much greater the actual acceleration is than the targeted acceleration (e.g., from ⅓ to 3 times greater), the current reduction rate can be established to range from about 0.1% to about 0.02% of maximum current.

When a drop in engine RPM exceeds a threshold or engine speed droop over time exceeds a threshold relative to the set engine RPM, current reduction will preferably be effected in accordance with the engine drooping rate and/or the amount of RPM drooped, but, in order to avoid hunting, only during the early modulation stage. Once modulation has advanced beyond an early stage, current may be held steady (current limited) but not reduced. AS previously noted, engine RPM droop is a reflection of the application loads/torques, and the current reduction/limitation will help to reduce the peak torque, avoid over load, and protect the mechanical system.

If the actual acceleration of output shaft 32 is less than the desired shaft acceleration and operation has proceeded to step 98, controller 20 then operates to increase the magnitude of the current. The particular manner in which current magnitude changes may vary for different control system embodiments.

At step 98, a first control system embodiment (here referred to as the "unmodified PTO clutch control system embodiment") may, whenever the desired acceleration exceeds the actual acceleration, increase the current magnitude by 0.1%.

An alternate second control system embodiment (here referred to as the "modified PTO clutch control system embodiment") may employ a proportional (more accurately, pseudo-proportional) adjustment algorithm to determine the increase in current. In accordance with such an algorithm, the control system may operate (a) if the actual acceleration of the PTO is determined to be less than the desired acceleration but greater than two-thirds of the desired acceleration, to apply current so as to increase the torque transmitted by the PTO clutch at a slow rate; (b) if the actual acceleration of the PTO is determined to be less than two-thirds of the desired acceleration but greater than one-third of the desired acceleration, to apply current so as to increase the torque transmitted at a medium rate; and (c) if the actual acceleration of the PTO is determined to be less than one-third of the desired acceleration, to apply current so as to increase the torque transmitted at a fast rate.

Figure 7:
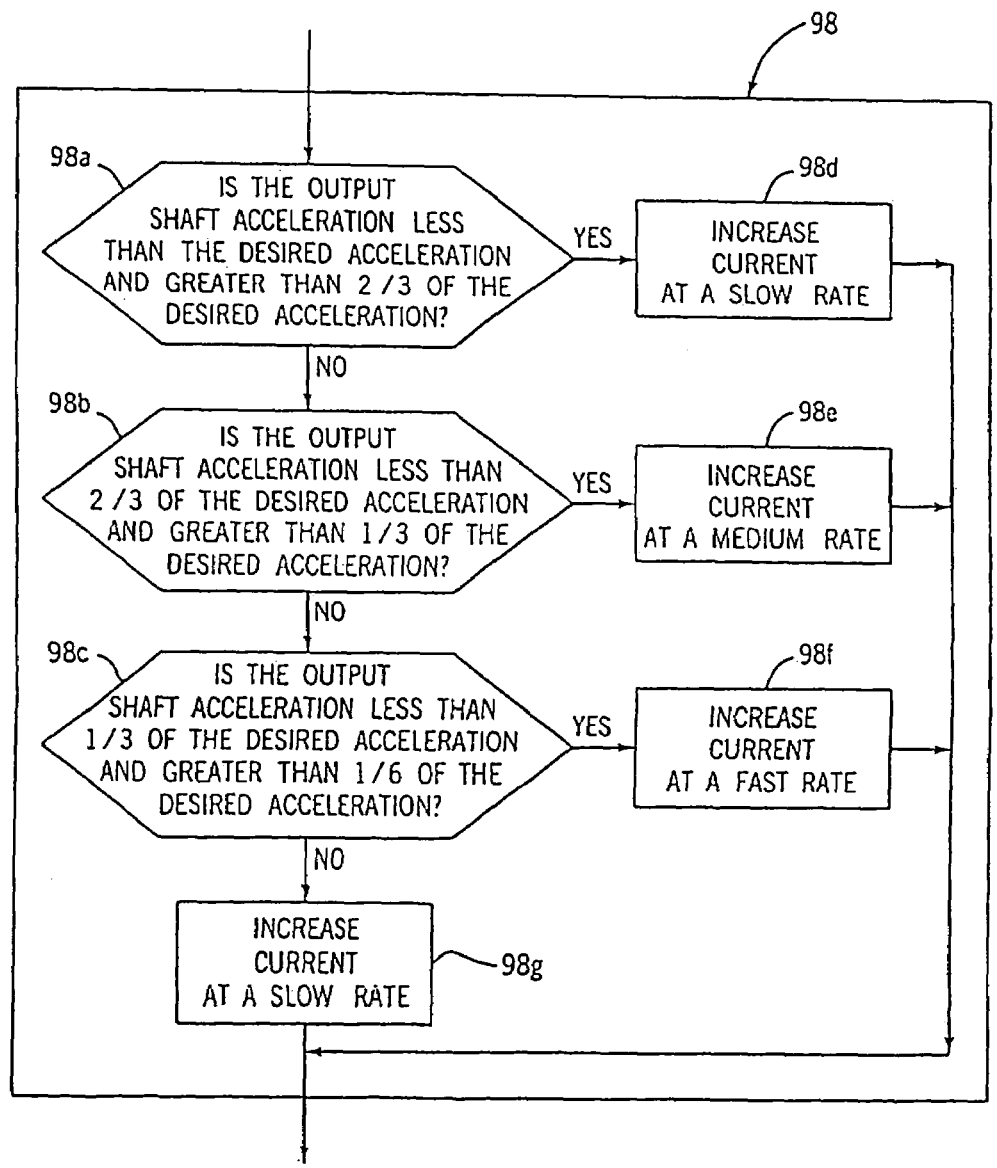
FIG. 7 is a flowchart representative of one embodiment of the functionality of step 98 of the flowchart of FIG. 3B.

A third control system embodiment (here referred to as the "modified proportional adjustment algorithm PTO clutch control system embodiment") has also been found to be practical and useful. FIG. 7 is a flowchart depicting the operational flow of one embodiment of the functionality of step 98 of the flowchart of FIG. 3B for a modified proportional adjustment algorithm PTO clutch control system embodiment. At step 98a, controller 20 determines if the actual acceleration is between the desired acceleration and two-thirds of the desired acceleration. If so, the program increases the current magnitude at a slow rate in step 98d before exiting step 98. If not, controller 20 proceeds to step 98b, at which it determines whether the actual acceleration is between two-thirds of the desired acceleration and one-third of the desired acceleration. If so, controller 20 increases the current magnitude at a medium rate in step 98e. If not, controller 20 proceeds to step 98c, at which it determines whether the actual acceleration is between one-third of the desired acceleration and one-sixth of the desired acceleration. If so, controller 20 increases the current magnitude at a fast rate in step 98f. If not, the actual acceleration is between zero and one-sixth of the desired acceleration, and controller 20 proceeds to step 98g at which it increases the current magnitude at a slow rate. (It should be noted that the program may be designed to treat actual accelerations that exactly equal two-thirds, one-third, or one-sixth of the desired acceleration as if the actual accelerations were above or below these levels.)

A significant characteristic of the modified proportional adjustment algorithm is that the modified proportional adjustment algorithm (a) determines whether the actual acceleration is below a minimum threshold proportion of the desired acceleration, and (b) increases the current magnitude at a slow rate if the actual acceleration is below the minimum threshold proportion even though the actual acceleration is significantly less than the desired acceleration. That is, in such an embodiment, the modified proportional adjustment algorithm determines in step 98c whether the actual acceleration is below one-sixth of the desired acceleration and, if so, increases the current magnitude at a slow rate in step 98g.

This feature of the modified proportional adjustment algorithm alleviates problems such as are described in U.S. Pat. No. 6,267,189 that are associated with possible spurious rotations of output shaft 32 due to premature delivery of torque by PTO clutch 18 (before the clutch is fully engaged) that may occur, for example, before over-running clutch 87 is locked. This is because, typically, once PTO clutch 18 is engaged and output shaft 32 is being accelerated, the output shaft would not have an actual acceleration less than one-sixth of the desired acceleration. Further, typically, PTO clutch 18 is not capable of delivering sufficient torque when the clutch is not fully engaged so as to cause output shaft 32 to accelerate at a rate greater than one-sixth of any of the desired accelerations that may be calculated by control system 10. Therefore, the modified proportional adjustment algorithm fulfills the two goals of (a) causing the current magnitude to increase at a fast rate when the actual acceleration of output shaft 32 is significantly less than the desired acceleration and yet (b) not causing the current magnitude to increase at a fast rate when PTO clutch 18 is still not fully engaged.

While, in such an embodiment, the ratios of actual acceleration to desired acceleration that determine the current magnitude increase rates are preferably set at two-thirds, one-third, and one-sixth, in alternate embodiments the ratios may be set at different levels. Indeed, different PTO clutch control systems may have a variety of different proportional adjustment algorithms that distinguish among more (or less) than four ranges (of ratios of actual acceleration to desired acceleration) and in which the control systems provide finer (or less fine) gradations of increases in the current magnitude. (Fully proportional control may also be appropriate in certain embodiments.) Also, the exact values for the "slow", "medium", and "fast" rates of current increase may vary depending upon the embodiment, although the "fast" rate of increase will typically be the fastest rate at which the mechanical clutch can predictably increase torque in response to commands from the control system to increase pressure. It should be noted that, while such an embodiment of the invention combines both the functionality of the modified proportional adjustment algorithm and the above-described repeated (continuous) recalculation of the desired acceleration (and modification of the desired speed curve), the modified proportional adjustment algorithm of step 98 may be employed even when the desired acceleration is only calculated once.

Although the foregoing discussion of steps 96 and 98 has focused on embodiments that make use of increases in current magnitude in engagement operations, embodiments that make use of increases in pulse width may also be employed. With such embodiments, if, at step 96, the actual acceleration of output shaft 32 is determined to be greater than or equal to the desired acceleration, the controller 20 proceeds to step 100, leaving the pulse width value unchanged. If, at step 96, the actual acceleration of output shaft 32 is determined to be less than the desired acceleration, the controller 20 proceeds instead to step 98, at which it operates to increase the current pulse width by 0.1%.

In certain of such systems, it may be desirable to reduce the pulse width value when the actual acceleration of output shaft 32 is greater than the desired acceleration. However, this type of control may cause hunting, and thus an acceleration of shaft 32 which is not smooth. Accordingly, in the presently preferred embodiments that utilize pulse width modulation techniques, it is considered preferable to leave the pulse width value unchanged when the actual acceleration of shaft 32 exceeds the desired acceleration. With such embodiments, a pulse width increase of 0.1% for each 10 ms interval (i.e., for each pass through step 98) has been found to be advantageous and preferable.

Any of these control system embodiments (or the programming contained therein) may be advantageously employed in conjunction with the control system described above in which the desired accelerations are repeatedly recalculated (i.e., such that the desired speed curve changes with engine speed).

Regardless of the particular embodiment, when the engagement operation reaches step 100 from either step 98 or step 99, controller 20 checks whether the increased current value, as set at steps 98, 99, or 102, exceeds the maximum allowable current value. If so, controller 20 proceeds to step 101 and resets the current value to the maximum allowable value before proceeding through point A of FIGS. 3B and 3A to step 104 of FIG. 3A; if not, controller 20 proceeds directly through point A of FIGS. 3B and 3A to step 104 of FIG. 3A.

Operation then proceeds in the manner previously described commencing at step 104 and continues in a MODULATION MODE operational loop until, at step 78 of FIG. 3B, the speeds are detected as being the same. At that time, MODULATION MODE ceases and RAMP MODE commences.

Operation then proceeds from step 78 to step 80, instead of to step 82, and at step 80 controller 20 then resets the timer count and also sets a STEADY STATE flag before proceeding to step 102. At step 102 controller 20 determines a current value to be applied, which, during RAMP MODE, may include incremental increases to the current value, such as by increasing the current magnitude by 1.00% (or, in alternative embodiments, increasing the pulse width value by 1.00%), before proceeding to step 100.

Upon completion of step 102, controller 20 proceeds to step 100, and operation continues therethrough and thereafter as previously described, with continuing operational looping through steps 80 and 102 of the RAMP MODE loop.

After the maximum current value is reached (at $T_{max}$) in continuing passes through step 102, RAMP MODE is completed, and steps 100 and 101 act to limit the current value to the maximum current valve.

If, in operational passes after the STEADY STATE flag has been set at step 80, speeds are subsequently found to (again) be different at step 78, controller 20 proceeds to step 82, where it checks to see if the STEADY STATE flag is set. Since the flag has previously been set, controller 20 proceeds to step 83.

At step 83, controller 20 determines whether or not the speed difference between shaft 19 (or engine 14) and shaft 32 is greater than some allowable deviation value, such as fifteen percent (15%). If the speed difference is greater than fifteen percent (15%), operation proceeds to step 85, which is indicative of a fault condition and results in termination of PTO operation. If the speed difference is less than 15%, controller 20 proceeds instead to step 102, from which point the operation will proceed as previously described. Typically, if the STEADY STATE flag has previously been set and step 102 is reached from step 83, the determined current value will be set at or near to the maximum allowable current value.

Figure 5:
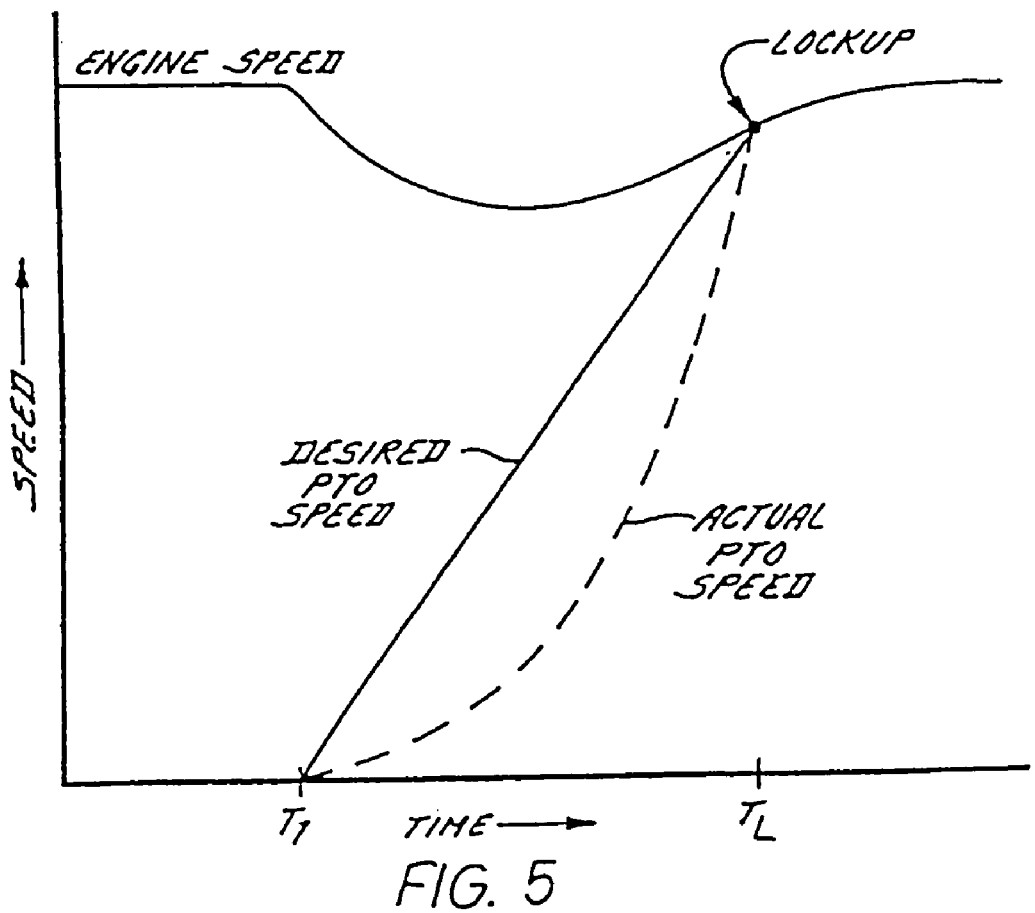
FIG. 5 is a graphical representation of actual and desired accelerations of a PTO shaft.

Referring now to FIGS. 4 and 5 relative to the foregoing discussion, it should be observed that PTO clutch lockup occurs at time $T_L$ when the speeds of input shaft 19 (or engine 14) and output shaft 32 become equal or proportional, as detected at step 78 of FIG. 3B. Following such occurrence, so long as the speeds remain the same, operation sequence controller 20 repeatedly proceeds through steps 102 and 100, increasing the current value with each pass through step 102, until the current value exceeds the maximum allowable current. At that point, and in subsequent passes through step 100, the current value is reset to the maximum allowable current value at step 101. Such actions cause the current value to be ramped up over time to produce a clutch pressure in PTO clutch 18 associated with the maximum allowable torque to be transmitted between input shaft 19 and output shaft 32. If the current value ever becomes greater than the maximum allowable current value, the current value is reset to the maximum allowable current value at step 101.

For embodiments that utilize PWM techniques, following lockup at time $T_L$ controller 20 proceeds through steps 100 and 102 to ramp up the pulse width value to produce a clutch pressure in clutch 18 associated with the maximum torque to be transmitted between shafts 32 and 19. In step 100, the current pulse width value is compared with the maximum pulse width value. If the current pulse width value set at steps 98, 99, or 102 is greater than the maximum pulse width value, controller 20 resets the pulse width value to the maximum pulse width value at step 101.

It should be recalled from discussions hereinabove that differing time limits may be established or utilized for different modes of the operation and that the timer is updated at step 109 of FIG. 3A as the looping operations proceed, as a consequence of which detection of a timing out of the timer at step 104 by the controller 20 may occur under several different circumstances.

In such regard, it should be recalled that one manner of reaching step 104 is through on operational loop including step 90. At step 90 the fill current value is set when output shaft 32 is detected as not moving at step 88. If, after operational looping during FILL MODE for a certain time, the output shaft 32 has not yet begun moving, controller 20 thus operates at step 104 to terminate the PTO operation.

Another manner in which step 104 can be reached is through an operational loop including steps 94, 96, and 98 or 99. If, after commencement of MODULATION MODE, the speeds of the input shaft 19 and the output shaft are not found to be the same at step 78 within a given time, lockup of the clutch has not occurred within that time, and controller 20 again operates at step 104 to terminate the PTO operation.

A further manner in which step 104 can be reached is through an operational loop including step 102. During RAMP MODE, so long as the speeds of the input and output shafts are the same, the timer is reset upon each passage through step 80. If the speeds differ at some point, however, operation will proceed through step 82 to step 83, instead of to step 80, and the timer will not be reset at step 80 in that loop. In continuing passes through a loop that includes step 83 instead of step 80, the timer will be repeatedly updated at step 109 (FIG. 3A) until either (a) the speeds are again found to be the same at step 78, and the timer is reset at step 80, or (b) the time limit for again achieving the same speeds is reached at step 104 (with such condition typically being indicative of undesirable slippage in the PTO clutch 18), resulting in termination of the PTO operation at step 107, or (c) detection of a fault condition at step 83, resulting in termination of the PTO operation at step 85.

In addition to the various checks performed and conditions tested, as discussed and described in the foregoing, additional checks and tests may be desirable with various systems, including, by way of example, periodic tests of engine speed and other operational factors or considerations, and the outcomes of such tests may be utilized in determining the course of operations without departing from the spirit and scope of the present invention.

Although various features of the control system are described and illustrated in the drawings, the present invention is not necessarily limited to these features and may encompass other features disclosed both individually and in various combinations. For example, developments in PTO clutches may make electric clutches cost effective for PTO applications. Accordingly, hydraulic clutch 18 and control valve 28 may potentially be replaced with an associated electric clutch and electric clutch control circuit.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a vehicle having a power source for producing rotational motion, a power take-off shaft for supplying rotational motion to at least one piece of equipment other than the vehicle, and a clutch including an input shaft coupled to the power source and an output shaft coupled to the PTO shaft, wherein the clutch transmits a maximum torque between the input and output shafts in response to a maximum clutch pressure and transmits a selectable torque between the input and output shafts in response to a selected clutch engagement pressure less than the maximum clutch engagement pressure, a power take-off control system comprising:

a first transducer disposed to generate an input shaft speed signal representative of the rotational speed of the input shaft;

a second transducer disposed to generate an output shaft speed signal representative of the rotational speed of the output shaft;

a clutch control configured to effect engagement and disengagement by the clutch in response to engagement control signals applied thereto, the clutch transmitting a selectable torque between the input and output shafts dependent upon a clutch engagement pressure defined by said engagement control signals, wherein the clutch engagement pressure is variable up to the maximum engagement pressure;

a controller coupled to the clutch control, the first transducer, and the second transducer, said controller operable to monitor the input shaft speed signals and the output shaft speed signals generated by said first and second transducers and to produce time-based engagement control signals dependent thereon, said engagement control signals each including a characteristic representative of an associated amount of clutch pressure to be applied, said controller operable to generate a first set of time-based engagement control signals during a time period between commencement of an engagement operation and the time at which an output shaft speed signal indicative of movement by the output shaft is detected by said controller, and a second set of engagement signals at times subsequent to said detection of movement by the output shaft, said controller operable, upon detection of movement of the output shaft, to determine whether the monitored input speed at such time has remained within an established deviation value from the nominal input speed prior to such time and to establish a first load status if the speed has remained within the established deviation value and to establish another load status if the speed has not remained within the established deviation value, said second set of time-based engagement signals including a subset of engagement control signals dependent, in part, upon the established load status and defining a flattened control curve relative to control curves that are established for loads of said another load status.

2. The system of claim 1 further comprising a source of pressurized hydraulic fluid, the clutch being a hydraulic clutch engageable at an engagement pressure related to the hydraulic pressure applied to the clutch, the clutch control including a hydraulic valve for coupling the clutch to the source of pressurized hydraulic fluid, and the hydraulic valve being a proportional valve configured to control the pressure of the fluid applied to the clutch from the source, wherein the pressure is dependent upon the first control signals.

3. The system of claim 2 wherein said controller includes a programmed microprocessor.

4. The system of claim 2 further comprising an over-running clutch associated with the output shaft.

5. The system of claim 3 further comprising an implement coupled to said over-running clutch.

6. The system of claim 2 wherein said controller includes a digital processor configured to produce engagement control signals the magnitudes of which are characteristics representative of associated amounts of clutch pressure to be applied at given times.

7. The system of claim 2 wherein said controller includes a digital processor configured to produce engagement control signals which are pulse-width modulated signals having a predetermined frequency, and the pressure applied to the clutch is substantially proportional to the pulse-width of the modulated signals.

8. The system of claim 7 further including filtering circuitry for coupling the first and second transducers to the digital processor.

9. The system of claim 7 wherein the first and second transducers are magnetic pickups located and proximate the input and output shafts, respectively.

10. The system of claim 1 wherein said subset of said second set of engagement control signals includes a plurality of control signals the characteristics of which are dependent upon the rate of change over time of the output shaft speed signals and the input shaft speed signal at a given time, whereby said controller determines a desired acceleration for the output shaft.

11. The system of claim 1 wherein said subset of said second set of engagement control signals includes a plurality of control signals the characteristics of which are dependent upon the rate of change over time of the output shaft speed signals and the input shaft speed signal at the time of engagement control signal generation, whereby said controller repetitively determines a desired acceleration for the output shaft over a period of time.

12. The system of claim 1 wherein said another load status includes a plurality of differentiable load types and said controller is operable to determine a particular load type dependent upon the time after commencement of an engagement operation that initial movement of the output shaft is detected.

13. The system of claim 1 wherein said first set of engagement control signals includes a plurality of shock control signals defining a series of shock control signals generated commencing at a given time during the time between commencement of an engagement operation and the time at which an output shaft speed signal indicative of movement by the output shaft is detected.

14. A method for engaging and operating variable loads on a power take-off shaft in a system having
   a power source for producing rotational motion;
   a power take-off shaft for supplying rotational motion to at least one piece of equipment coupled to the power take-off shaft;
   a clutch including an input shaft coupled to the power source and an output shaft coupled to the PTO shaft, wherein the clutch transmits a maximum torque between the input and output shafts in response to a maximum clutch pressure and transmits a selectable torque between the input and output shafts in response to a given clutch engagement pressure less than the maximum clutch engagement pressure;
   a first transducer disposed to generate an input shaft speed signal representative of the rotational speed of the input shaft;
   a second transducer disposed to generate an output shaft speed signal representative of the rotational speed of the output shaft;
   a clutch control configured to effect engagement and disengagement by the clutch in response to engagement control signals applied thereto, the clutch transmitting a selectable torque between the input and output shafts dependent upon a given clutch engagement pressure defined by said engagement control signals, wherein the clutch engagement pressure is variable up to the maximum engagement pressure;
   a controller coupled to the clutch control, the first transducer, and the second transducer, said controller operable to monitor the input shaft speed signals and the output shaft speed signals generated by said first and second transducers, and to produce time-based engagement control signals dependent thereon,
   the engagement control signals each including a characteristic representative of an associated amount of clutch pressure to be applied; and
   the controller operable to generate a first set of time-based engagement control signals during a time period between commencement of an engagement operation and the time at which an output shaft speed signal indicative of movement by the output shaft is detected by said controller, and a second set of engagement signals at times subsequent to said detection of movement by the output shaft;
the method comprising:
   (a) monitoring the output shaft speed signals to detect the speeds at given times of the output shaft and initial movement of the output shaft as a result of application of engagement control signals;
   (b) monitoring the input shaft speed signals to detect the speeds at given times of the input shaft;
   (c) determining, upon detection of initial movement of the output shaft, the deviation of speed of the input shaft and establishing a first load status if the speed deviation has remained within an established deviation value and establishing another load status if the speed has not remained within the established deviation value;
   (d) applying, for said first load status, a set of time-based engagement control signals defining a flattened control relative to control curves that would be applied for loads of said another load status.

15. The method of claim 14 wherein, at a plurality of predetermined times during said first time period, the controller generates distinct engagement control signals that are shock control signals each having a characteristic defined by a different relationship than the characteristics of non-shock control signals generated over the first period of time, the characteristic of each such shock control signal being associated with a markedly and distinguishably higher clutch pressure and out of accordance with the particular pattern of clutch pressures associated with non-shock engagement control signals generated over the first period of time.

16. The method of claim 15 including the step, after detection of initial movement of the output shaft, of
   (e) categorizing within said another load status the load on the power take-off shaft based upon the detected time of initial movement of the output shaft relative to at least one predetermined time;
   and wherein the second set of time-based engagement control signals are dependent upon the load status and the load categorization made in step (e).

17. The method of claim 16 wherein a first subset of said second set of engagement control signals comprises engagement control signals dependent upon the rate of change over time of the output shaft speed signals and the input shaft speed signal at a given time, whereby the controller determines a desired acceleration for the output shaft.

18. The method of claim 14 wherein a first subset of said second set of engagement control signals comprises engagement control signals dependent upon the rate of change over time of the output shaft speed signals and the input shaft speed signal at the time of engagement control signal generation, whereby the controller repetitively determines a desired acceleration for the output shaft over a period of time.

19. The method of claim 14 wherein the engagement control signals have characteristics which are representative of associated amounts of clutch pressure to be applied at given times.

20. The method of claim 14 wherein the engagement control signals have magnitudes which are characteristics representative of associated amounts of clutch pressure to be applied at given times.

21. The method of claim 14 wherein the engagement control signals are pulse-width modulated signals having a predetermined frequency, and the pressure applied to the clutch is substantially proportional to the pulse-width of the modulated signals.

22. The method of claim 14 wherein, at a plurality of predetermined times during said first time period, the controller generates distinct engagement control signals that are shock control signals each having a characteristic defined by a different relationship than the characteristics of non-shock control signals generated over the first period of time, the characteristic of each such shock control signal being associated with a markedly and distinguishably higher clutch pressure and out of accordance with the particular pattern of clutch pressures associated with non-shock engagement control signals generated over the first period of time.

23. A method for engaging variable loads on a power take-off shaft in a system having
- a power source for producing rotational motion;
- a power take-off shaft for supplying rotational motion to at least one piece of equipment coupled to the power take-off shaft;
- a clutch including an input shaft coupled to the power source and an output shaft coupled to the PTO shaft, wherein the clutch transmits a maximum torque between the input and output shafts in response to a maximum clutch pressure and transmits a selectable torque between the input and output shafts in response to a given clutch engagement pressure less than the maximum clutch engagement pressure;
- a first transducer disposed to generate an input shaft speed signal representative of the rotational speed of the input shaft;
- a second transducer disposed to generate an output shaft speed signal representative of the rotational speed of the output shaft;
- a clutch control configured to effect engagement and disengagement by the clutch in response to engagement control signals applied thereto, the clutch transmitting a selectable torque between the input and output shafts dependent upon a given clutch engagement pressure defined by said engagement control signals, wherein the clutch engagement pressure is variable up to the maximum engagement pressure;
- a controller coupled to the clutch control, the first transducer, and the second transducer, said controller operable to monitor the input shaft speed signals and the output shaft speed signals generated by said first and second transducers, and to produce time-based engagement control signals dependent thereon,
- the engagement control signals each including a characteristic representative of an associated amount of clutch pressure to be applied; and
- the controller operable to generate a first set of time-based engagement control signals during a time period between commencement of an engagement operation and the time at which an output shaft speed signal indicative of movement by the output shaft is detected by said controller, and a second set of engagement signals at times subsequent to said detection of movement by the output shaft;

the method comprising:
- (a) monitoring the input and output shaft speed signals to detect the speeds at given times of the input and output shafts;
- (b) periodically checking to determine if output shaft movement has occurred;
- (c) upon detection of initial output shaft movement, checking to determine whether the monitored input speed at such time has remained within an established deviation value from the nominal input speed prior to such time and,
  - (1) if the input speed has remained within the established deviation value, establishing a first load status and then proceeding to step (d); or
  - (2) if the input speed has not remained within the established deviation value, establishing another load status and then proceeding to step (d);
- (d) applying a set of time-based engagement control signals, dependent in part upon the established load status, to the clutch;
- whereby a set of time-based engagement control signals for the first load status define a flattened control curve relative to control curves that would be applied for loads of said another load status.

24. The method of claim 23 wherein generation of the second set of time-based engagement control signals includes the step, prior to step (d), of categorizing within the another load status the load on the power take-off shaft based upon the detected time of initial movement of the output shaft relative to at least one predetermined time, and wherein the engagement control signals applied in step (d) are dependent upon such load categorization.

* * * * *

UNITED STATES PATENT AND TRADEMARK OFFICE
Certificate

Patent No. 7,234,366 B2

Patented: June 26, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yanming Hou, Pleasant Prairie, WI (US); and Darrel Svendsen, Racine, WI (US).

Signed and Sealed this Twenty-sixth Day of October 2010.

RICHARD W. L. RIDLEY
*Supervisory Patent Examiner*
Art Unit 3656
Technology Center 3600